United States Patent [19]

Swain et al.

[11] Patent Number: 4,959,109

[45] Date of Patent: Sep. 25, 1990

[54] APPARATUS AND PROCESS FOR PREPARING BELTS

[75] Inventors: Eugene A. Swain, Webster, N.Y.; Marvin Menzin, Lexington, Mass.; Edward A. Agranat, Weston, Mass.; Henry R. Cofek, Westford, Mass.; Daniel J. Fisher, Chelmsford, Mass.

[73] Assignee: Xerox Corporation, Stamford, Conn.

[21] Appl. No.: 374,598

[22] Filed: Jun. 30, 1989

Related U.S. Application Data

[63] Continuation of Ser. No. 845,205, Mar. 27, 1986, abandoned.

[51] Int. Cl.$^5$ ............................................. B32B 31/18
[52] U.S. Cl. ................................... 156/73.4; 156/130; 156/134; 156/137; 156/184; 156/218; 156/396; 156/405.1; 156/414; 156/446; 156/456; 156/458; 156/580.1
[58] Field of Search ............................... 156/446–448, 156/456–458, 184, 189, 191–192, 414, 425, 137, 218, 130, 133, 134, 73.4, 405.1, 580.1, 580.2, 396, 583.8, 417, 406.4; 414/911, 330, 222, 225, 752, 910, 912; 221/211; 222/335; 269/21

[56] References Cited

U.S. PATENT DOCUMENTS

| | | | |
|---|---|---|---|
| 3,085,713 | 4/1963 | Reiners | 221/211 |
| 3,375,777 | 4/1968 | Techtmann | 156/583.8 |
| 3,673,024 | 6/1972 | Eriksson | 156/137 |
| 3,754,425 | 10/1973 | Neff | 156/218 |
| 3,791,897 | 2/1974 | Mesly | 156/414 |
| 3,867,229 | 2/1975 | Marra | 156/417 |
| 4,033,768 | 7/1977 | Wieloch | 96/1.5 |
| 4,042,655 | 8/1977 | Platt et al. | 264/25 |
| 4,078,961 | 3/1978 | Aoki et al. | 156/360 |
| 4,105,486 | 8/1978 | Cantarutti | 414/910 |
| 4,173,314 | 11/1979 | Curran et al. | 242/58.4 |
| 4,222,811 | 9/1980 | Enders | 156/405.1 |
| 4,285,750 | 8/1981 | DeMartino | 156/456 |
| 4,359,675 | 11/1982 | Miller, III | 318/603 |
| 4,434,019 | 2/1984 | Hollaway, Jr. | 156/137 |
| 4,465,536 | 8/1984 | Makino | 156/414 |
| 4,532,166 | 7/1985 | Thomsen et al. | 428/57 |

Primary Examiner—Merrell C. Cashion, Jr.

[57] ABSTRACT

Processes and apparatus for fabricating belts are disclosed comprising conveying a first mandrel to a wrapping station, supplying the leading edge of a web from a web supply roll to the first mandrel at the wrapping station, retaining the leading edge of the web on the first mandrel by means of a partial vacuum, wrapping the web around the first mandrel by rotating the first mandrel for about one revolution, severing the web at the wrapping station to form a trailing edge which overlaps the leading edge of the web to form a first belt having a seam, substantially simultaneously conveying the first mandrel to a welding station and conveying a second mandrel to the wrapping station, and substantially simultaneously wrapping the second mandrel with fresh web material from the web supply roll and welding the seam on the first belt on the first mandrel to form a unitary belt. These welded belts may be automatically removed from the mandrels at a belt discharge station.

20 Claims, 13 Drawing Sheets

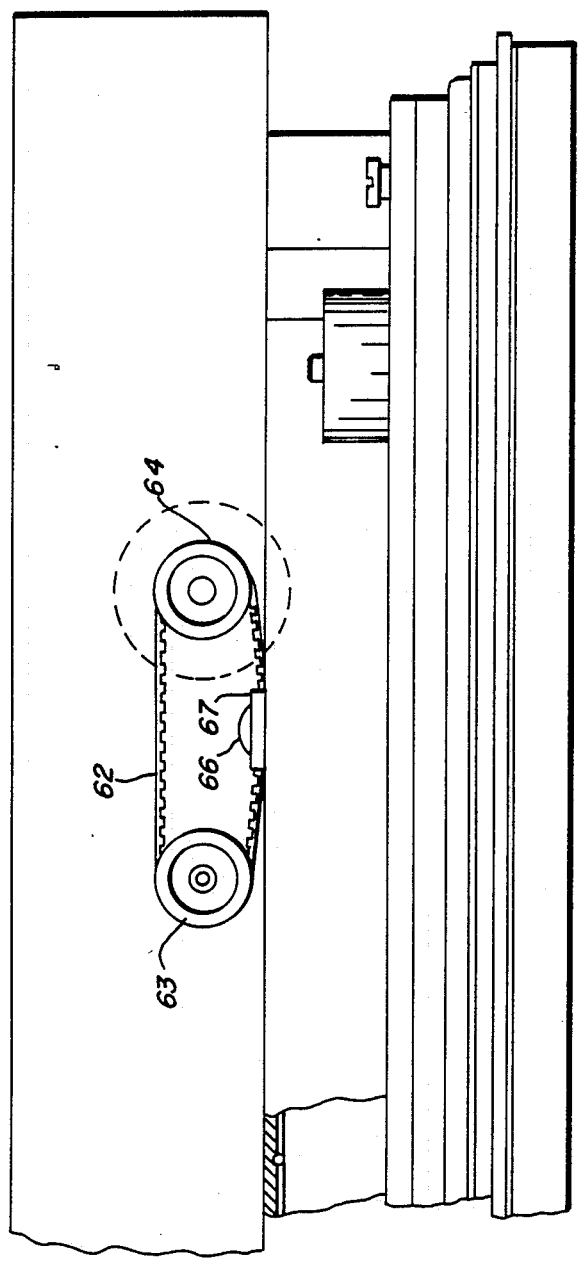

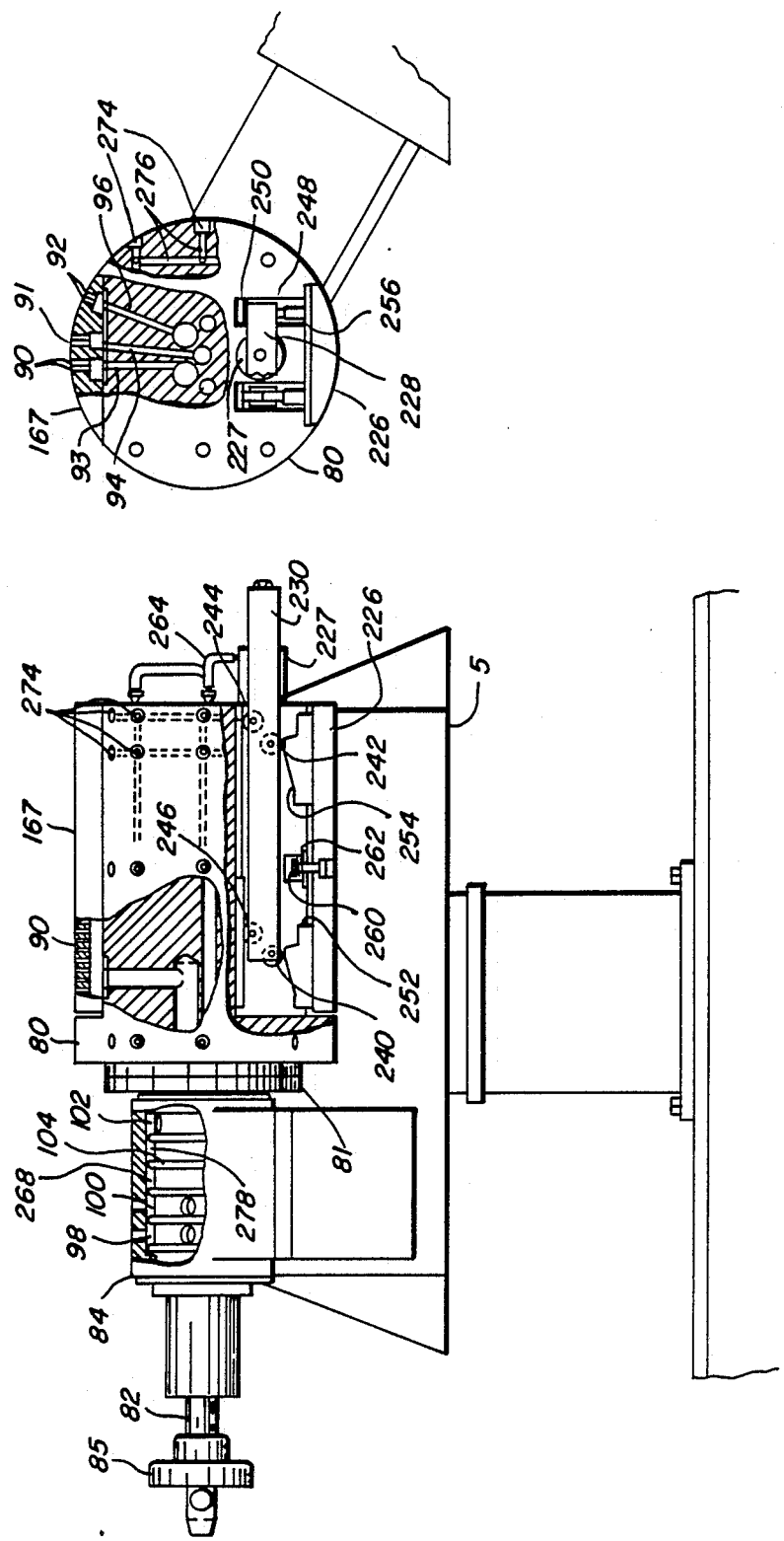

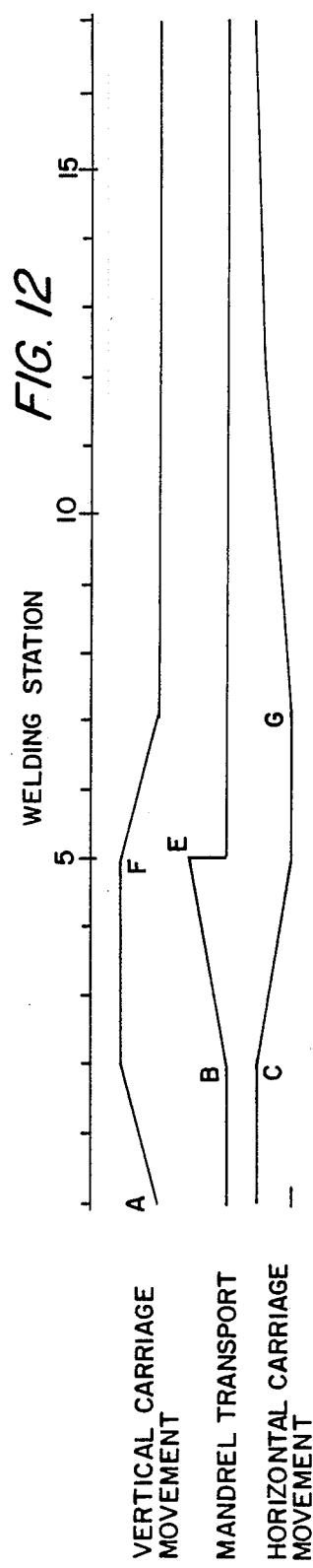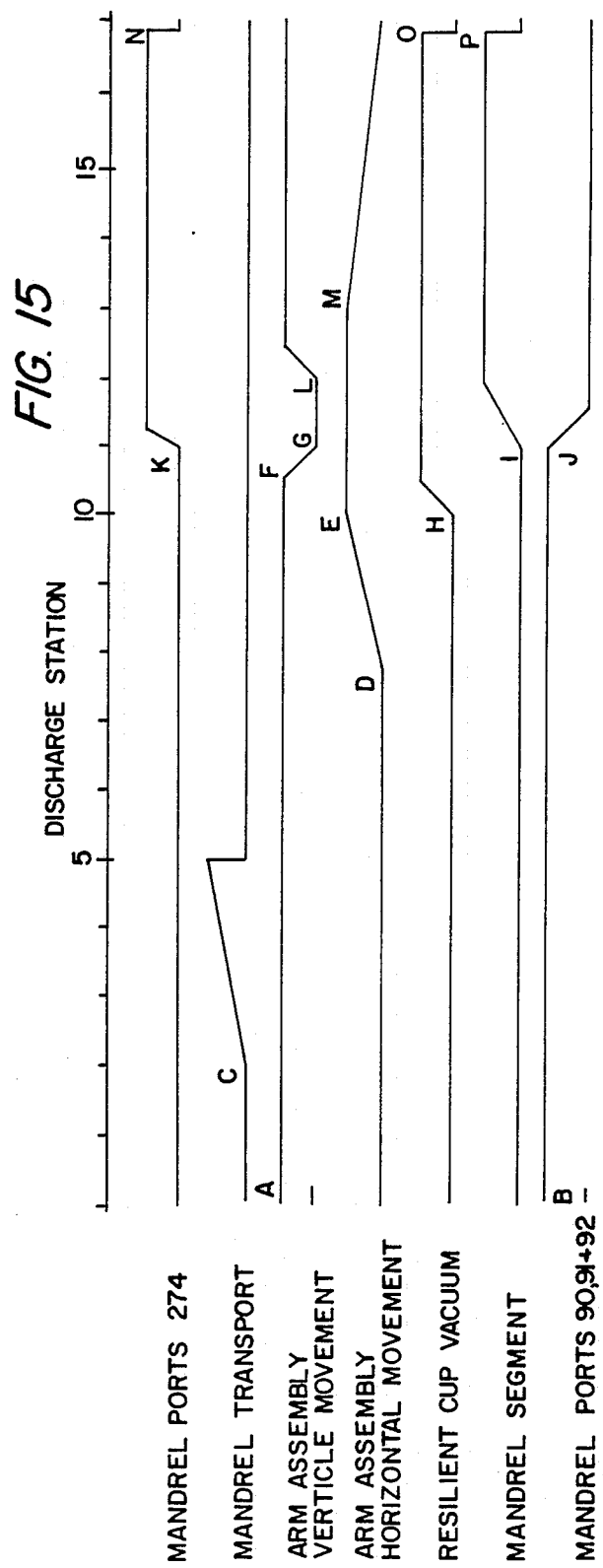

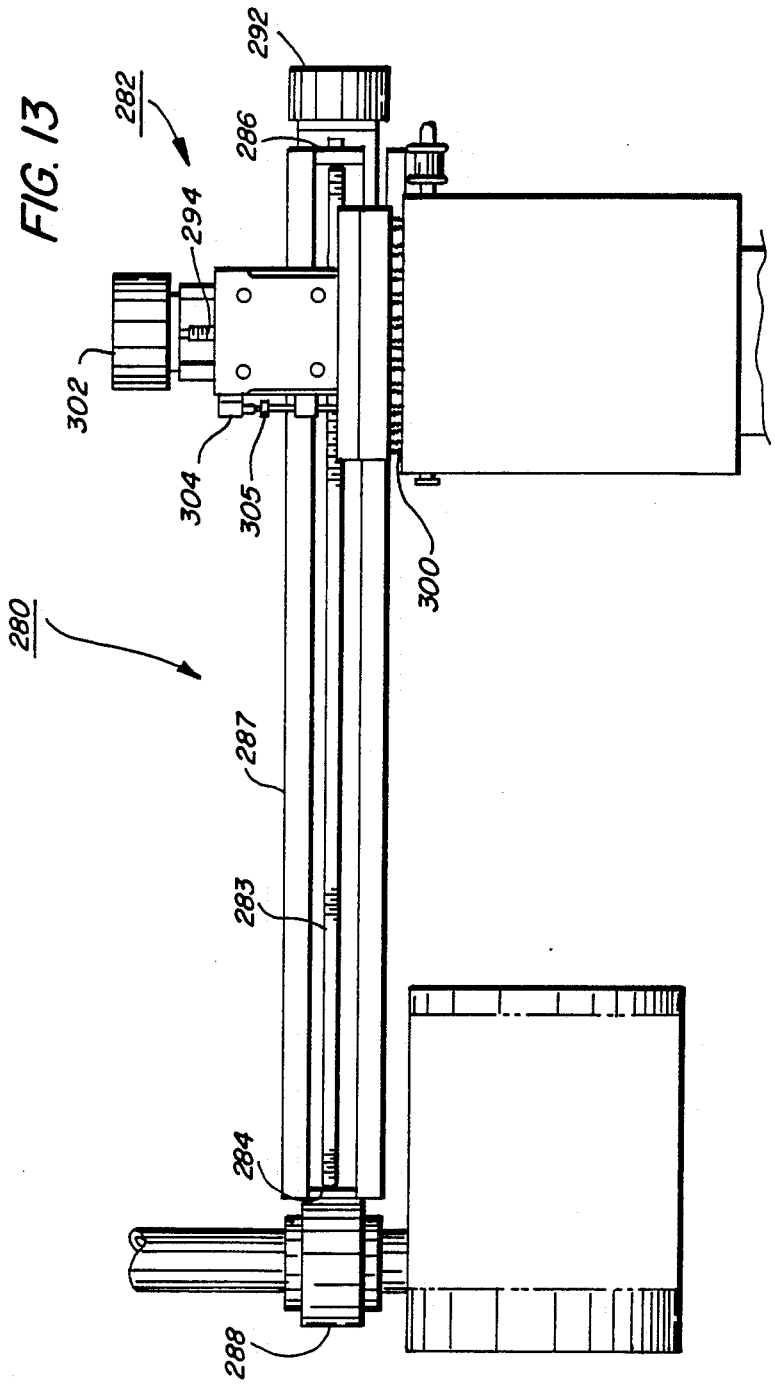

APPARATUS AND PROCESS FOR PREPARING BELTS

This is a continuation, of application Ser. No. 06/845,205, filed Mar. 27, 1986 now abandoned.

BACKGROUND OF THE INVENTION

This invention relates in general to apparatus and processes for fabricating flexible belts.

Various techniques have been devised to form belts from webs. Thermoplastic webs may be joined by overlapping the edge of one web over another and placing the overlapped or seam portion of the webs over a base beneath a vibrating welding element. The vibrating welding element may be a horn vibrating at an ultrasonic frequency while it is brought into forced contact with one side of the overlapped webs while the other side of the overlapped web seam is supported on an anvil surface. Transfer of vibratory energy from the horn to the web material is effected upon impact of a suitably shaped surface of the horn on the seam of the web material. The vibrating energy causes surface heat to be generated between the overlapping webs along the area of contiguous contact between the webs. The horn normally resonates toward and away from the seam at a frequency of about 16 kHz or higher. The weld may be in the form of a chain of spots along the seam or a continuous weld. The technique of ultrasonic welding of thermoplastic material is well known and illustrated, for example, in U.S. Pat. No. 4,532,166, U.S. Pat. No. 3,879,256, U.S. Pat. No. 3,939,033, U.S. Pat. No. 3,947,307 and U.S. Pat. No. 3,459,610, all incorporated by reference herein in their entirety.

Unfortunately, batch processes for cutting and welding webs into belts require considerable time, duplicate manual handling, occupy excessive floor space and also require extensive equipment for alignment, cutting, welding trimming and other processing steps.

Further, excessive manual handling increases the likelihood of damage to sensitive substrates or coatings, particularly for coated substrates that must meet precise tolerance requirements such as flexible electrostatographic imaging members including photoreceptors for high speed electrostatographic copiers, duplicators, printers and the like. Scratches and even fingerprints on the vulnerable surfaces of a sensitive, flexible photoreceptor renders the photoreceptor unacceptable for most electrostatographic copiers, duplicators and printers.

When multiple batch handling techniques are utilized to to fabricate belts, it is also often difficult to achieve uniform belt conicity and uniform quality. Moreover, because of differences in belt size requirements for different electrostatographic copiers, duplicators, printers and the like, a machine suitable for fabricating a belt of one diameter or width cannot be readily used to prepare a belt of a different diameter or width.

Thus the characteristics of belt fabrication systems exhibit deficiencies for rapidly manufacturing belts having precise tolerance requirements.

SUMMARY OF THE INVENTION

It is an object of the invention to overcome the above-noted deficiencies by providing a process and apparatus for fabricating belts comprising conveying a first mandrel to a wrapping station, supplying the leading edge of a web from a web supply roll to the first mandrel at the wrapping station, retaining the leading edge on the first mandrel by means of a partial vacuum, wrapping the web around the first mandrel by rotating the first mandrel for about one revolution, severing the web at the wrapping station to form a trailing edge which overlaps the leading edge of the web to form a first belt having a seam, substantially simultaneously conveying the first mandrel to a welding station and conveying a second mandrel to the wrapping station, and substantially simultaneously wrapping the second mandrel with fresh web material from the web supply roll and welding the seam on the first belt on the first mandrel to form a unitary belt. These welded belts may be automatically removed from the mandrels at a belt discharge station.

The flexible belts may be rapidly prepared without attendant problems caused by manual handling. Further, because of the uniform shape achieved, the flexible belts prepared by the apparatus and processes of this invention are particularly useful for applications such as electrostatographic photoreceptors utilizing sensitive organic layers. In addition, precise control of the dimensions of the photoreceptors may be achieved even where the apparatus and processes of this invention are employed, for example, to fabricate belts of different diameters or different widths.

BRIEF DESCRIPTION OF THE DRAWINGS

A more complete understanding of the process and apparatus of the present invention can be obtained by reference to the accompanying drawings wherein:

FIG. 6 is an expanded schematic, sectional view of a horizontal alignment means for an infeed.means.

FIG. 7 is a schematic, sectional side view of airways in a mandrel.

FIG. 8 is a schematic, sectional end view of airways in a mandrel.

FIG. 12 is a timing chart for a web welding station.

FIG. 13 is a schematic, sectional view of means to remove welded belts from a mandrel.

FIG. 15 is a timing chart for a web discharge station.

DESCRIPTION OF THE PREFERRED EMBODIMENTS

Figure 1:
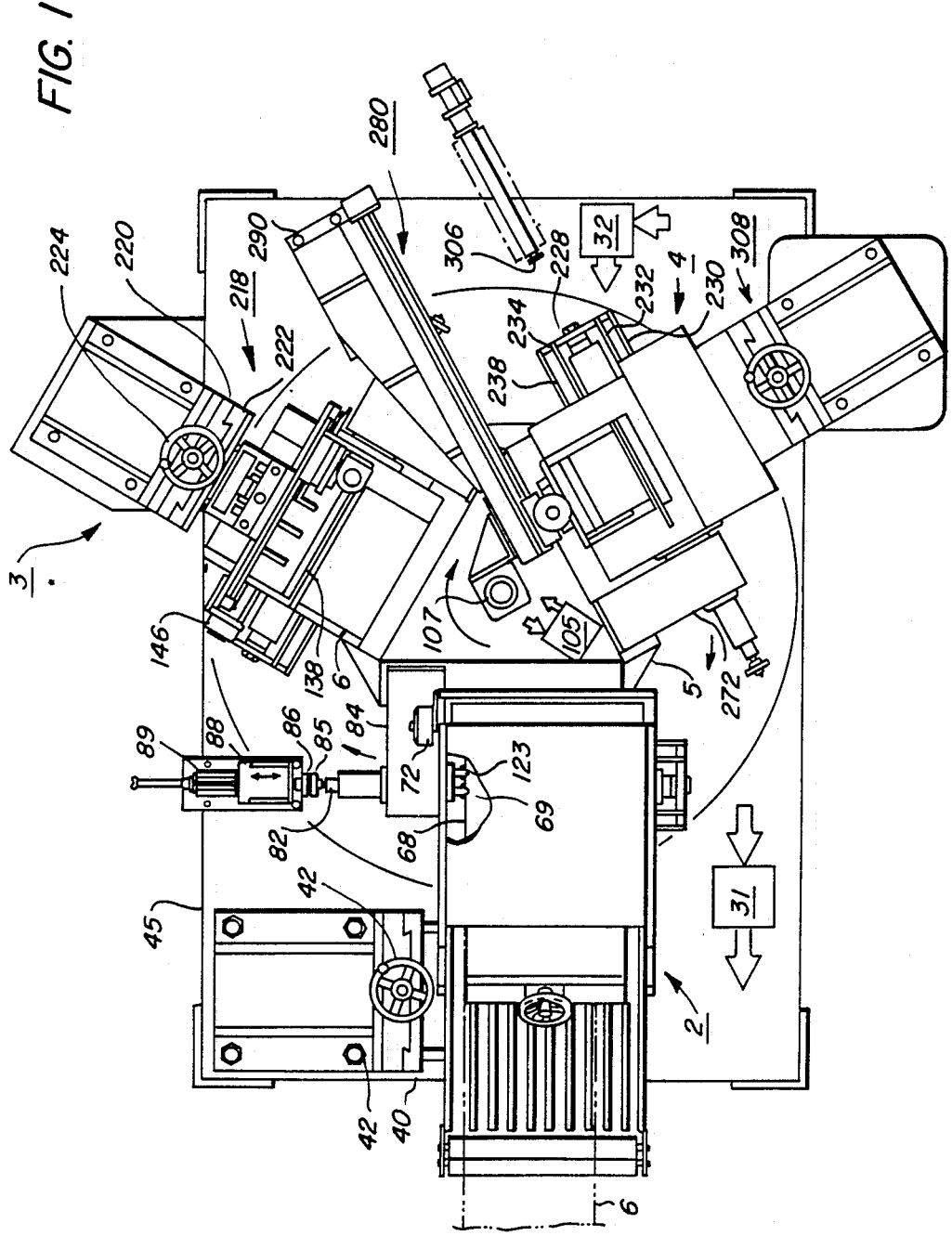
FIG. 1 is a schematic, plan view showing apparatus having three processing stations for fabricating belts from a web.

Referring to FIG. 1, processing stations for fabricating belts from a web are disclosed. These processing stations comprise a wrapping station 2, a welding station 3 and a discharge station 4, part of each station being supported on a rotatable platform 5.

Figure 2:
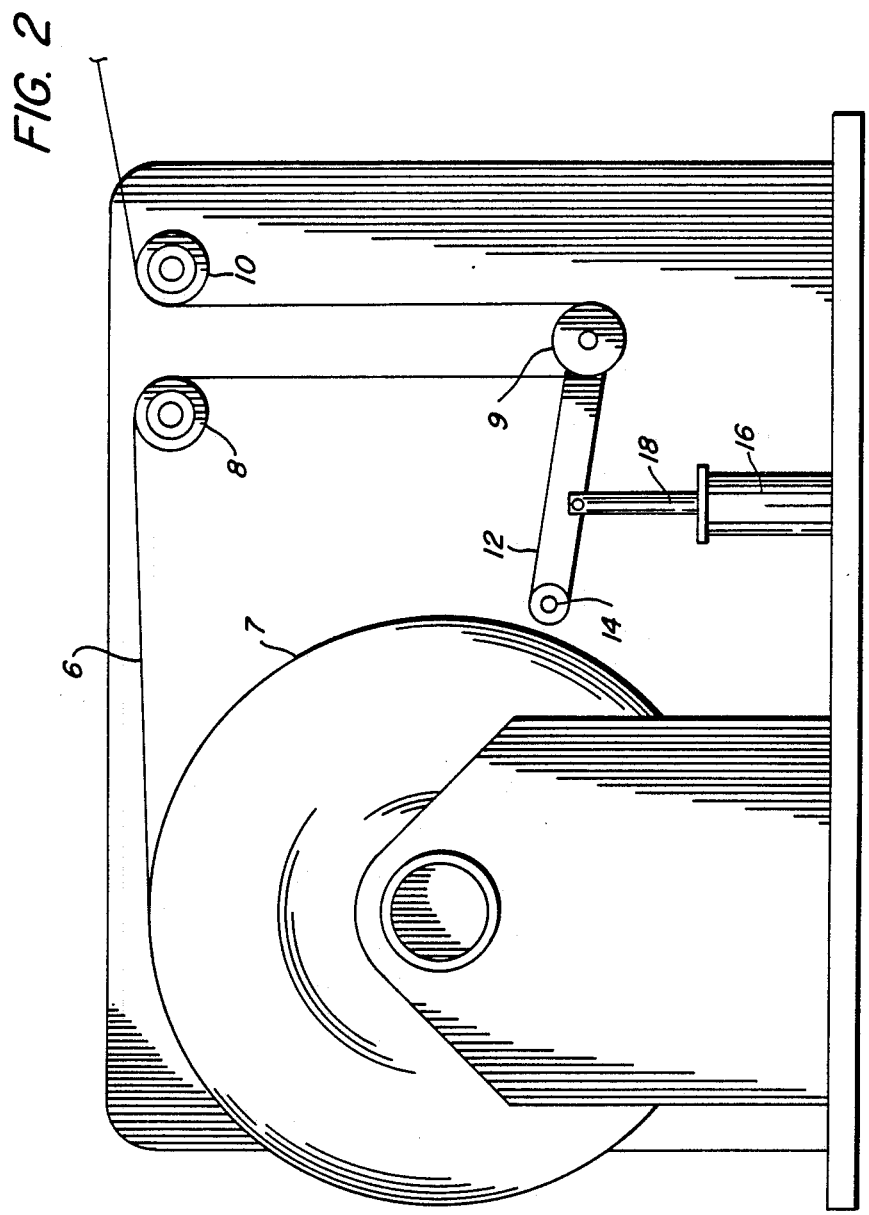
FIG. 2 is a schematic, sectional view of web supply and feed apparatus.

As shown in FIG. 2, web 6, such as a thin coated or uncoated thermoplastic web, is supplied by a supply roll 7 and fed around guide roll 8, dancer roll 9 and guide roll 10. Dancer roll 9 contains a hollow annular chamber (not shown) and a porous outer shell of metal particles. Dancer roll 9 is supported by idler arm 12 which is supported by and pivots around stationary shaft 14. Slack in the web 6 is taken up by downward pressure applied to idler arm 12 by pneumatic cylinder 16 through connecting rod 18.

Figure 3:
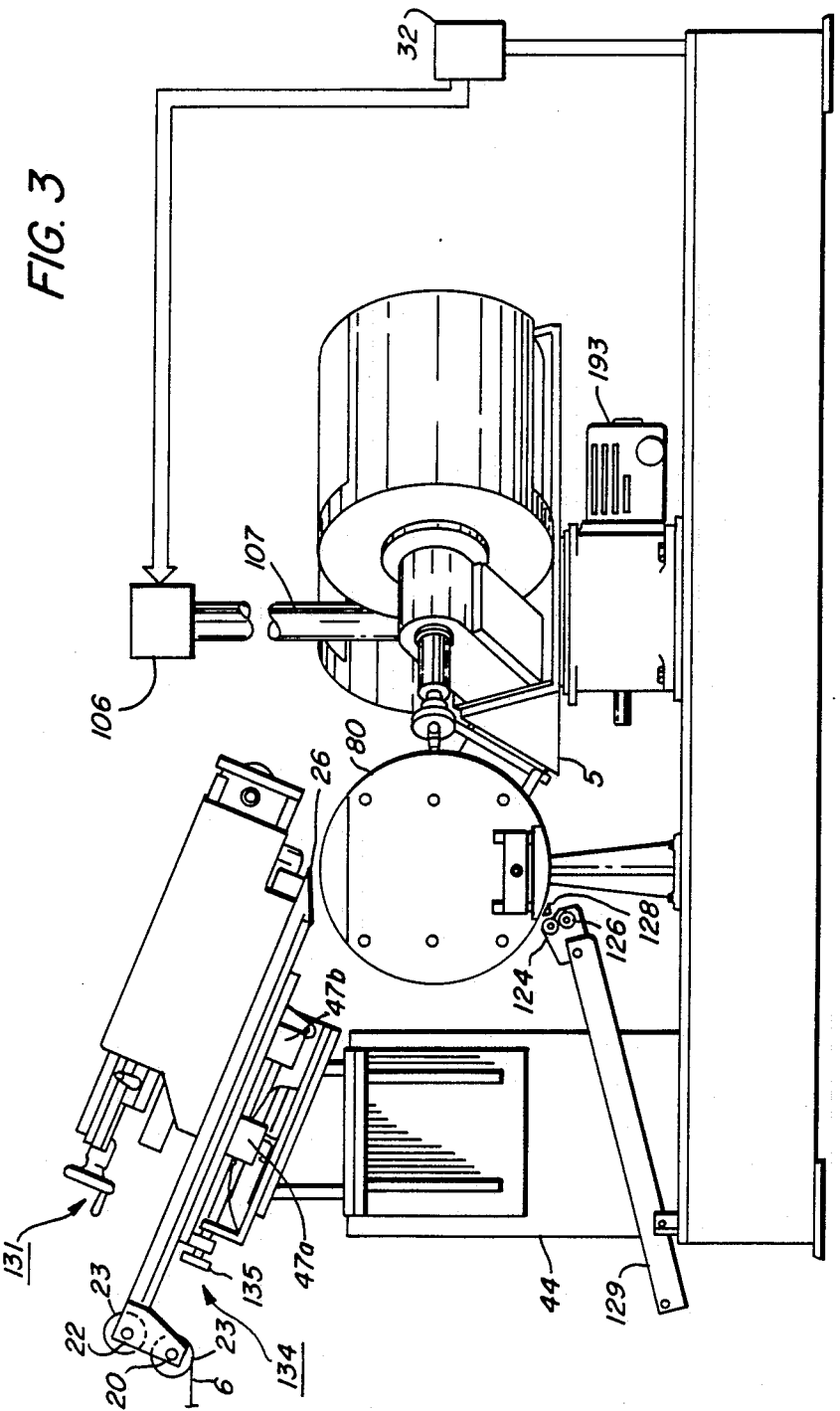
FIG. 3 is a schematic, isometric view of apparatus having three processing stations for fabricating belts from a web particularly illustrating details of the wrapping station.

The wrapping station 2 is shown in greater detail in FIG. 3. The web 6 supplied by supply roll 7 is passed around stationary air bearings 20 and 22. Air bearings 20 and 22 and dancer roll 9 comprise hollow annular chambers (not shown) and a porous outer shell such as shell of sintered metal particles. Air under pressure from a suitable source is fed through conventional hoses (not shown) to the hollow annular chambers of dancer roll 9, air bearing 20 and air bearing 22 and allowed to escape through the porous shell to provide an air bearing which prevents damaging contact with the surfaces of web 6 and reduces friction that must be overcome to pull the web 6 from the supply roll 7. Moreover, the "S" shape of the path of web 6 around air bearing 20 and 22 imparts sufficient lateral strength to web 6 to allow collars 23 on air bearings 20 and 22 to laterally position the web 6 without buckling as it travels through wrapping station 2. If desired, the "S" shaped path may be extended to provide a longer serpentine path for web 6. The dancer roll 9 and air bearings 20 and 22 are commercially available in the form of a porous metal tube, e.g. from Mott Metallurgical Corporation, Farmington Connecticut. If desired, supply roll 7 may be fitted with an adjustable brake or drag (not shown) to regulate the amount of tension employed to pull web 6 from supply roll 7.

Figure 4:
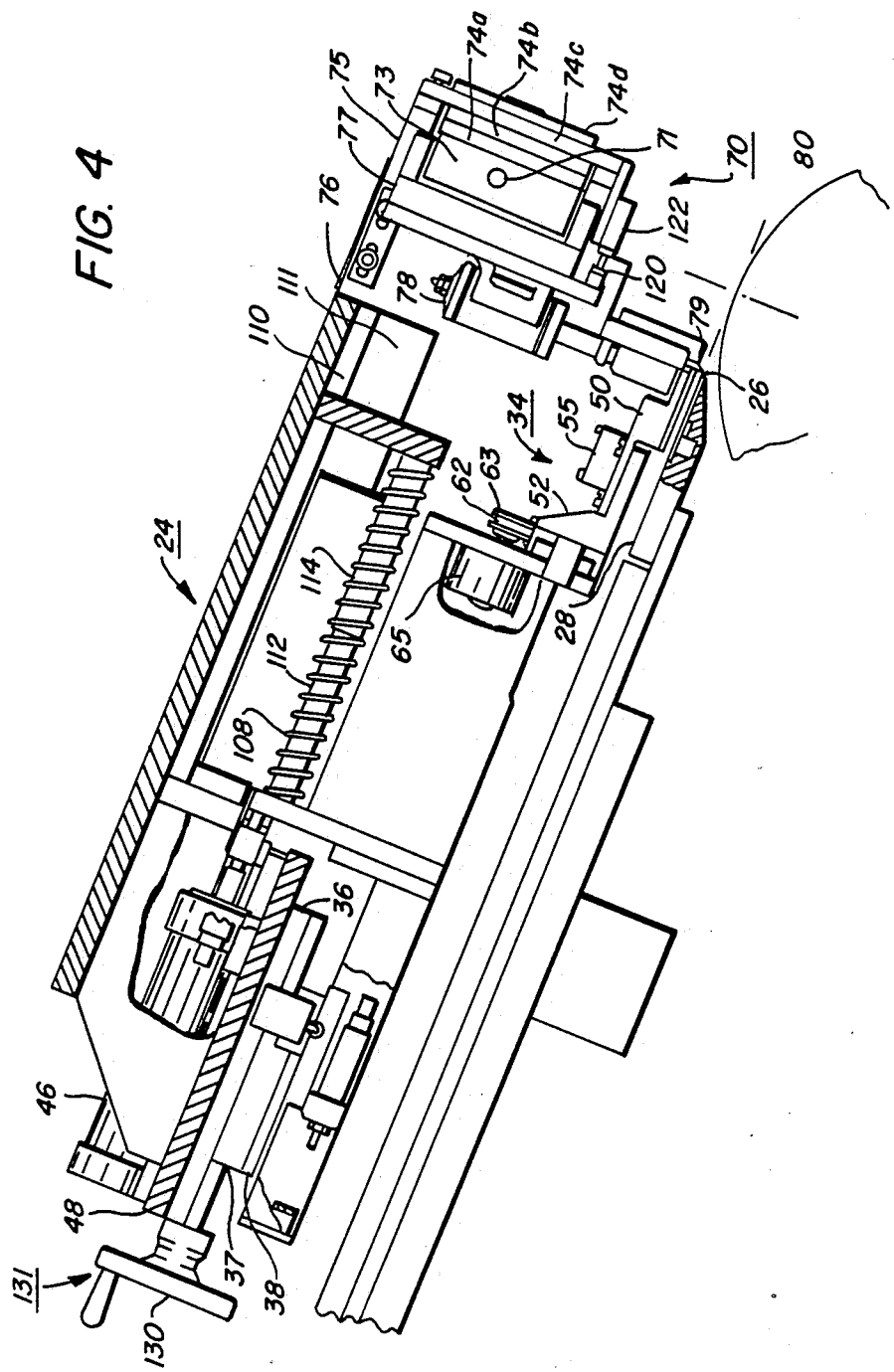
FIG. 4 is a schematic, sectional view of an infeed means for a feeding web to a mandrel.
Figure 5:
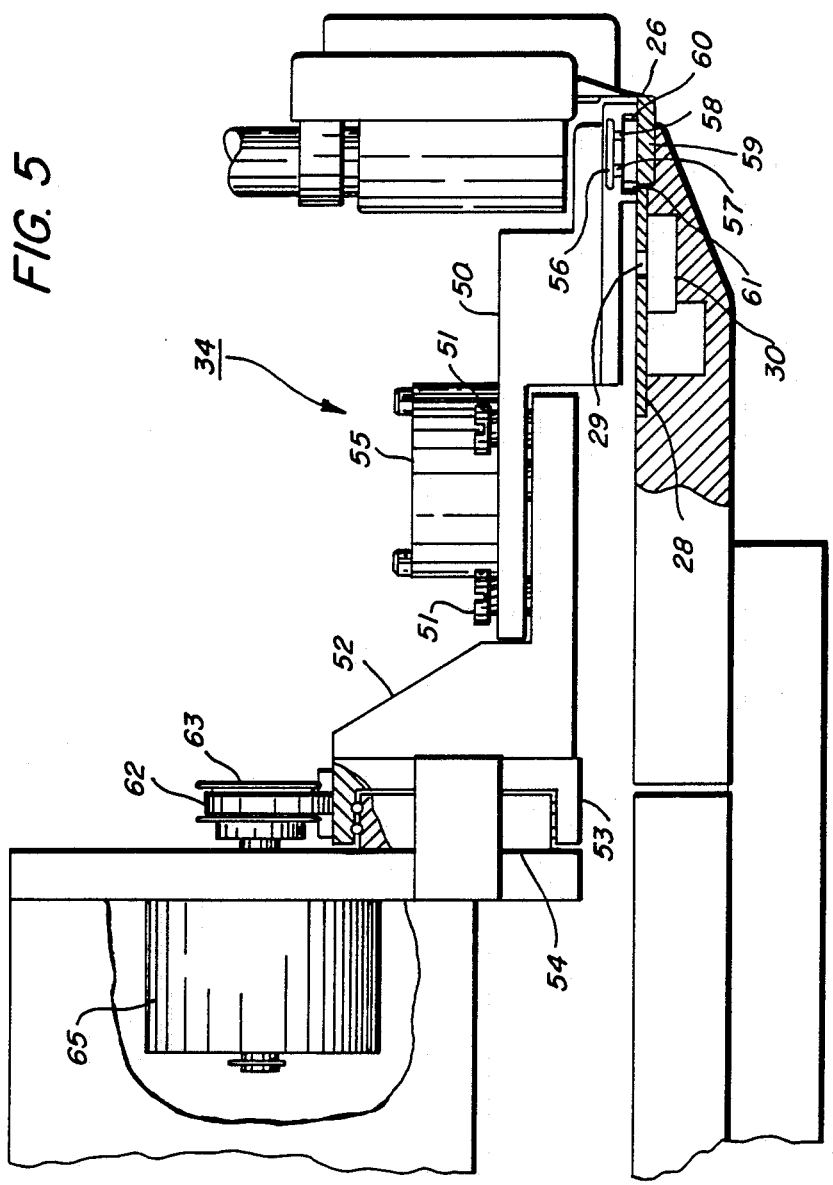
FIG. 5 is an expanded schematic, sectional view of a segment of an infeed.means.

The upper section, reciprocating web transport assembly, 24, of wrapping station 2 is shown in greater detail in FIGS. 4 and 5. The free end of web 6 is initially fed to the edge 26 of support platform 28 and held against support platform 28 by a partial vacuum provided by vacuum slot 29 which is connected to vacuum chamber 30. If desired, the vacuum slot 29 may alternatively comprise one or more rows of holes of any suitable shape. The creation and removal of a vacuum in vacuum chamber 30 may be accomplished by activating a solenoid operated valve in valve and switch cluster 31 (see FIG. 1). Valve and switch cluster 31 also includes other suitable valve and electrical switch actuators for the various pneumatic cylinders, motors and the like in the station subassemblies not mounted on rotatable platform 5. The valves in valve and switch cluster 31 are conventional solenoid operated valves which are commercially available, for example from Mac Valves, Inc., Wixom, Michigan. Positive pressure, a vacuum or ambient air pressure may be supplied from any suitable conventional source by suitable means such as ordinary air coupling lines (not shown). The expression "vacuum" as employed herein is intended to mean a partial vacuum rather than a complete vacuum. Similarly, electrical power to drive electrical equipment such as motors, solenoids and the like are supplied through suitable wiring and conventional suitable electrical switching. The valves and switches are usually actuated through suitable circuitry in response to a signal from a programmable controller 32 (see FIGS. 1 and 3). Expressions such as "activation", "supplying power", "inactivation" and the like are well known terms intended to include opening or closing solenoid operated valves or electrical switches to provide or discontinue providing positive pressure, a vacuum, ambient air pressure, electricity and the like. Thus, the control functions in the apparatus of this invention are synchronized and integrated with a suitable programmable controller 32 such as a Texas Instruments Programmable Controller, Model No. 530 which activates solenoid operated valves that either vent the chamber 30 to the ambient atmosphere or connect chamber 30 to another larger evacuated chamber (not shown). Reciprocating web transport assembly 24 mounted above support platform 28 and web 6 is supported on plate 36 secured to suitable ball bearing blocks slideably mounted on a pair of slide rails such as Thomson slides (not shown) available, for example, from Thomson Industries, Manhasset, N.Y. The slide rails are supported by support plates 37 and 38 horizontally cantilevered from feedscrew adjustable slide assembly 40 (see FIG. 1) which is vertically adjustable by means of hand wheel 41 to accommodate different diameter mandrels. Feedscrew adjustable slide assembly 40 is anchored by bolts 42 to a platform 44 (see FIG. 3) secured to main platform 45 resting on the floor of the building in which the belt fabricating machinery is housed. Reciprocation of web transport assembly 24 and support platform 28 between a fully retracted position and an advanced intermediate position (shear position illustrated in FIGS. 3 and 4) is effected with the aid of a pair of suitable pneumatic cylinders (not shown) which moves web transport assembly 24 and support platform 28 on suitable ball bearing blocks 47a and 47b which are in turn slideably mounted on a pair of slide rails such as Thomson slides (not shown). This movement of web transport assembly 24 and support platform 28 to a fully retracted position from an advanced intermediate position (shear position) permits a fresh mandrel to be indexed from the discharge station 4 to wrapping station 2 without striking any part of reciprocating web transport assembly 24 and support platform 28.

Referring to FIGS. 4 and 5, web transport assembly 24 includes a web transport subassembly 34. Web transport subassembly 34 is reciprocated from the advanced intermediate position (shear position) of web transport assembly 24 and support platform 28 to a web placement position by actuation of a pair of pneumatic cylinders 46 (only one shown) mounted on adjustment plate 48. Actuation of pneumatic cylinders 46 is accomplished by programmable controller 32 to control conventional valves in valve and switch cluster 31 to connect pneumatic cylinders 46 by suitable air hoses (not shown) to a source of compressed air. Web transport subassembly 34 comprises a vacuum pick up arm 50 which is adapted to vertically reciprocate on shouldered screws 51. Shouldered screws 51 are, in turn, screwed into support arm 52. Support arm 52 is mounted on slide block 53 adapted to slide horizontally on rail 54.

Vacuum pick up arm 50 is vertically reciprocated on shouldered screws 51 by a pair of pneumatic cylinders 55. Vacuum pick up arm 50 also includes a vacuum chamber 56 connected by a plurality of passageways 57 and 58 to a plurality of slots 59 which are perpendicular to and connect with parallel vacuum pick up slots 60 and 61. The length of vacuum pick up slot 60 and and vacuum pick up slot 61 are normally slightly shorter than the width of web 6. If desired, additional rows of slots or other suitably shaped apertures may be substituted for slots 59, 60 and 61. The creation and removal of a vacuum in vacuum chamber 56 is accomplished by programmable controller 32 which controls suitable conventional solenoid activated valves in valve and switch cluster 31 which either connect chamber 56 to another larger evacuated chamber or vent chamber 56 to the ambient atmosphere. Similarly, activation by programmable controller 32 of valves in valve and switch cluster 31 supplies pneumatic cylinders 55 with pressurized air to vertically reciprocate vacuum pick up arm 50 on shouldered screws 51. Pneumatic cylinders 55 are conventional two-way acting cylinders in which piston movement is determined by which side of the piston is pressurized. In other words, the piston is made to move in one direction by pressurized air introduced onto a first chamber on a first side of the piston and made to move in the opposite direction by diverting the pressurized air into a second chamber on the other side of the piston while venting the first chamber.

As shown in FIGS. 5 and 6, support arm 52 is mounted on slide block 53 adapted to slide horizontally on rail 54. A timing belt 62 is mounted on pulleys 63 and 64. Pulley 64 is reversibly driven by servo motor 65. Belt 62 is fastened to the top of slide block 53 by screw 66 and clamp 67. Activation of the servo motor 65 causes slide block 53 to slide horizontally on rail 54. Horizontal movement of slide block 53 permits alignment of the side edge 68 (see FIG. 1) of web 6 with the aid of edge sensor 69. Edge sensor 69 may comprise any suitable photoelectric sensor. Typical sensors include, for example, sensors comprising a row of light emitting diodes, air stream sources, etc. positioned perpendicular to and partially over web side edge 68 and a row of detectors positioned perpendicular to and partially under web side edge 68 or vice versa. A suitable photoelectric sensor is available, for example from Frost Controls, Inc., Smithfield, Rhode Island. Edge sensor 69 senses any deviation of the side edge 68 of web 6 and activates servo motor 65 to realign side edge 68 with a predetermined position relative to support platform 28.

A cutting assembly 70 is also shown in FIG. 4. The cutting assembly 70 comprises a ball lead screw assembly comprising a lead screw (threaded shaft) 71 on which is mounted a suitable ball (not shown) which reciprocates back and forth on lead screw 71 when the screw is rotated by electric motor 72 (see FIG. 1). Lead screw 71 is supported at each end by vertical end plates 73. Vertical end plates 73 are supported by plates 74a, 74b, 74c and 74d. Plate 74c is bolted to one end of a pair of brackets 75 (only one is shown) and the other ends of brackets 75 are bolted to vertical side plates 76 (only one is shown). A carriage 77 is mounted on the ball for horizontal reciprocation along the axis of lead screw 71. The carriage 77 carries a pneumatic cylinder 78 which is adapted to extend and retract a disk knife 79 to and from the edge 26 of support platform 28. Actuation of pneumatic cylinder 78 is accomplished by programmable controller 32 to control suitable conventional valves (not shown) connected to a source of compressed air.

Referring to FIGS. 3 and 4, mandrel 80 is positioned below the edge 26 of support platform 28 to receive the web 6 from reciprocating web transport subassembly 34. As illustrated in FIGS. 1 and 7, one end of mandrel 80 is secured by bolts (not shown) to flange 81 of mandrel shaft 82 extending through a journal box 84. Mandrel shaft 82 is equipped with a rapid disconnect jaw coupling 85 adapted to mate with a rapid disconnect jaw coupling 86 mounted on the end of a drive shaft of a retractable electric motor 88 (see FIG. 1). Any suitable conventional rapid connect coupler such as a Lovejoy, Inc. coupling may be employed. The motor 88 and coupling 86 are retracted away from coupling 85 by activating a pneumatic cylinder 89. Actuation of pneumatic cylinder 89 is accomplished by programmable controller 32 to control suitable solenoid operated valves in valve and switch cluster 31 connecting pneumatic cylinder 89 through suitable air lines (not shown) to a source of compressed air. Journal box 84 is securely fastened to rotatable platform 5 and is adapted to travel in a circular path when rotatable platform 5 is rotated for indexing each mandrel from one station to the next.

In FIGS. 7 and 8, parallel rows of ports 90, 91 and 92 are positioned axially along the outer periphery of mandrel 80 in about the 12 o'clock position, 12:03 o'clock position and 1 o'clock position respectively. These ports 90, 91 and 92 are independently connected through airways 93, 94, and 96, respectively, that extend from the ports 90, 91 and 92 through shaft 82 to circumferential channels 98, 100 and 102, respectively, each of the channels being separated by "O" ring seals 104. Circumferential channels 98, 100 and 102 are connected through corresponding air lines through the journal box 84 to a cluster of electrically activateable valves and switches 105 (see FIG. 1). The ports 90, 91 and 92 are shown as parallel rows of a plurality of small holes. However, any other suitably shaped openings may be used in place of or in addition to the holes in ports 90, 91 and 92. For example, one or more slots such as the slots 59, 60 and 61 employed in vacuum pick up arm 50 illustrated in FIG. 5 may be substituted for the holes in ports 90, 91 and 92. The valves in the cluster of valves and switches 105 are suitable conventional solenoid operated valves which are commercially available. Each of the valves in the cluster of valves and switches 105 is connected by conventional hoses to circumferential channels (not shown), but of basically similar construction to the circumferential channels 98, 100 and 102) of a rotary union enclosed within housing 106 (see FIG. 1) on central support shaft 107 which supports rotatable platform 5. Positive pressure, a vacuum or ambient air pressure may be supplied from any suitable conventional source to the journal box 84 through the housing 106 by conventional means such as suitable air coupling lines (not shown). Similarly, electrical power to drive electrical equipment such as motors, solenoids and the like are supplied through suitable conventional slip rings (not shown) enclosed in housing 106. Conventional electrical switching is employed to couple or uncouple electric motors with an electrical power source through suitable circuitry in response to a signal from a suitable programmable controller 32 such as a Texas Instruments Programmable Controller, Model No. 530. Although mandrel 80 is illustrated as a cylinder having a circular cross section, the cross section may be of any other suitable shape. Typical cross sections include, for example, an ellipse, a parabola, and the like. Although the cross section of the mandrel need not be symmetrical, the location of the web seam on the mandrel is preferably positioned parallel to the axis of the mandrel along an imaginary line or band on the outer periphery of the cylinder defined by the greatest radius of the cylinder. This avoids the necessity for any additional adjustments to be made during the wrapping, welding and discharge operations to accommodate the varying distances between the mandrel surface and, for example, vacuum pick up arm 50 when using a mandrel having an unsymetrical cross section. If desired, the outer surface of the mandrel may contain major discontinuities, e.g. comprise a plurality of parallel slats spaced from each other.

Figure 9:
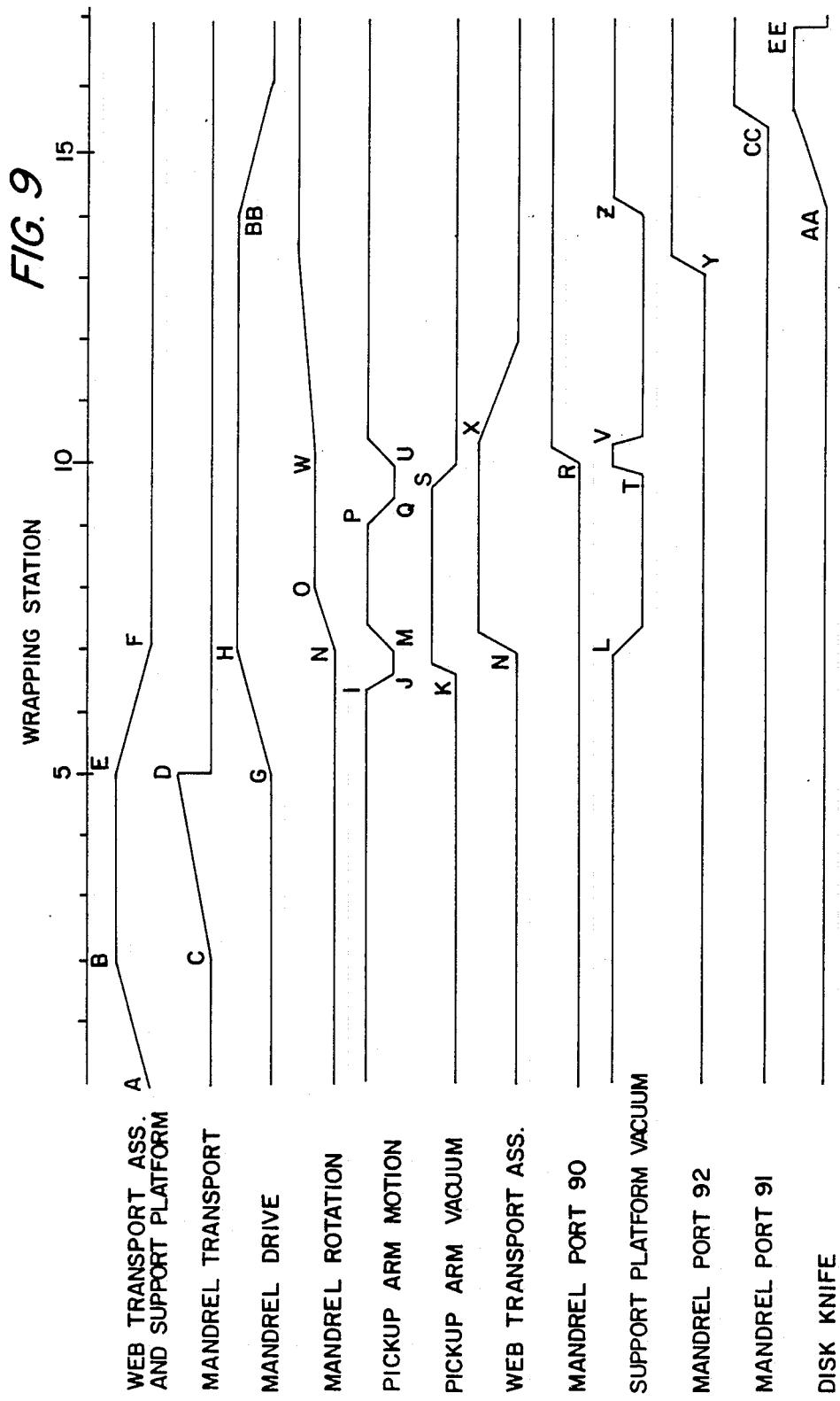
FIG. 9 is a timing chart for a web wrapping station.

In operation, and with reference to the web transport timing sequence illustrated in FIG. 9, the reciprocating web transport assembly 24 and support platform 28 are initially retracted (A) from an advanced intermediate position (shear position) to a fully retracted position (B) to provide clearance for indexing of a mandrel from discharge station 4. The end of web 6 is flush with edge 26 as a result of shearing during the previous wrapping cycle. Dancer roll 9 compensates for any tendency of slack to form in web 6 when reciprocating web transport assembly 24 and support platform 28 are in the fully retracted position and also assists in maintaining web 6 under tension during the wrapping operation. When reciprocating web transport assembly 24 and support platform 28 are fully retracted, rotatable platform 5 is rotated to transport an unwrapped mandrel from discharge station 4 (C) to wrapping station 2 (D). When mandrel 80 arrives at wrapping station 2, extension is initiated (E) for reciprocating web transport assembly 24 and support platform 28 from the fully retracted position to the shear position (F). Pneumatic cylinder 89 is activated (G) to extend electric motor 88 toward mandrel 80 and engage couplings 85 and 86 (H). As reciprocating web transport assembly 24 and support platform 28 proceed from the fully retracted position to the shear position, vacuum pick up arm 50 is lowered by activation of pneumatic cylinders 55 (I) to position vacuum passageways 57 and 58 against the end of web 6 (J). Advancement of web transport assembly 24 compresses springs 108 against plate 110 which is bolted and welded to plate 111 and telescopes tube 112 into tube 114. Plate 111 remains stationary during advancement of web transport assembly 24 toward mandrel 80 from the shear position. As vacuum passageways 57 and 58 are brought against the end of web 6, a vacuum is applied to vacuum chamber 56 by activation of a valve in valve and switch cluster 31 (K), the valve being connected by suitable hoses (not shown) to vacuum chamber 56 and a suitable vacuum source (not shown). Upon application of the vacuum to vacuum passageways 57 and 58 in vacuum pick up arm 50, vacuum supplied to vacuum chamber 30 in support platform 28 is terminated by activation of a valve in valve and switch cluster 31 (L) to release the end (leading edge) of web 6 from support platform 28. Vacuum pick up arm 50 is raised by activation of pneumatic cylinders 55 to lift the end of web 6 off support platform 28 (M). As the web 6 is lifted away from the surface of support platform 28, pneumatic cylinders 46 are activated to advance reciprocating web transport assembly 24 and the end of web 6 toward mandrel 80 (N). At about the same time, motor 88 and coupling 86 are extended by activation of pneumatic cylinder 89 until coupling 86 is engages with coupling 85. Electric power is then supplied to motor 88 to begin rotating mandrel 80 (N) clockwise (see FIG. 4) to advance the parallel rows of ports 90 on the periphery of mandrel 80 about 15 degrees from the 12 o'clock position (O). Vacuum pick up arm 50 is lowered by activation of pneumatic cylinders 55 (P) to place the end of web 6 over parallel rows of ports 90 (Q). As the end of web 6 is placed over parallel rows of ports 90, a vacuum is supplied to parallel rows of ports 90 (R) to secure web 6 to mandrel 80; vacuum supplied to vacuum chamber 56 is terminated (S) to release web 6 from vacuum pick up arm 50 and a vacuum is supplied to vacuum chamber 30 (T) to secure web 6 to support platform 28. Next, vacuum pick up arm 50 is raised by activation of pneumatic cylinders 55 (U) and the vacuum supplied to vacuum chamber 30 is terminated (V). Electric power is then supplied to motor 88 to begin rotating mandrel 80 (W) clockwise for about 345 degrees until it is wrapped with web 6 and pneumatic cylinders 46 are activated to retract (X) reciprocating web transport assembly 24 to the shear position. Shock absorbers 116 and 118 absorb most of the kinetic energy of the returning web transport assembly 34. While web transport assembly 34 is advanced from and retracted to its shear position, carriage 77 remains next to electric motor 72 (see FIG. 1) out of the way and to one side of the path of web transport assembly 34. As mandrel 80 nears the end of its rotation cycle, a vacuum is supplied to parallel rows of ports 92 (Y) which anchors the adjacent region of web 6 to mandrel 80 to ensure that web 6 remains tightly wrapped under tension on the mandrel 80 even after a subsequent web cutting operation. When mandrel 80 completes its rotation cycle of 360 degrees, a vacuum is supplied to vacuum chamber 30 (Z) to secure web 6 to support platform 28; pneumatic cylinder 78 is activated (AA) to extend disk knife 79 through web 6 and against edge 26; and electric motor 72 is started to rotate lead screw 71 to reciprocate carriage 77 and disk knife 79 across the width of web 6 thereby severing web 6. While web 6 is being sheared, compressed air is supplied to pneumatic cylinder 89 (see FIG. 1) to retract electric motor 88 and disengage couplings 85 and 86 (BB). Upon completion of shearing, a vacuum is supplied to the parallel rows of ports 91 (CC) to suck and tack the freshly severed trailing end of web 6 against mandrel 80. Since mandrel 80 was initially rotated 15 degrees, the freshly severed trailing end of the web 6 overlaps the leading end to form a seam 138. Pneumatic cylinder 78 is inactivated (DD) to retract disk knife 79 from edge 26. Upon return of the carriage 77 to the initial start position, roller cam 120 strikes limit switch 122 to shut off motor 72 (EE).

Wrapping station 2 also has the capability of automatically separating (culling) quality portions of the web from defective portions of the web. By applying bar codes to the edge of the web 6 and employing sensors to detect defective sections of the web prior to, during and after coating, predetermined defect maps based on the bar code reference marks on the web 6 may be detected by a suitable bar code reader 123 (see FIG. 1) such as a bar code scanner available from Scope, Inc., Reston, Virginia. When the scanner detects a bar code that has previously been identified as indicating the location of a defect on web 6, the detection signal is transmitted to programmable controller 32. Upon receiving the defect detection signal, programmable controller 32 is programmed to switch to a rejection mode in which the partial vacuum applied to parallel rows of ports 90 in mandrel 80 (see FIG. 8) is vented as the leading edge of web 6 approaches the nip of pinch rolls 124 and 126 (see FIG. 3). Pinch roll 124 is driven by a suitable electric motor (not shown) and pinch roll 126 is an idler roll. Upon venting of the partial vacuum applied to parallel rows of ports 90, the leading edge of web 6 falls away from the underside surface of mandrel 80, and with the optional assistance of stripper finger 128, is drawn into the nip between pinch rolls 124 and 126 onto a conveyor 129 for disposal as scrap. After web transport assembly 34 is retracted to the shear position, pneumatic cylinder 78 is activated to extend disk knife 79 through web 6 and against edge 26. Electric motor 72 (see FIG. 1) is started to rotate lead screw 71 to reciprocate carriage 77 and disk knife 79 across the width of web 6 thereby severing web 6. Upon return of the carriage 77 to the initial start position, roller cam 120 strikes limit switch 122 to shut off motor 72. If the fresh web to be processed next is free of defects, a normal wrapping cycle is begun.

When a photoreceptor belt of a different size is required which has a greater or lesser width and/or diameter than the belts currently in production, mandrels of the appropriate diameter and/or width may readily be substituted for the previous mandrel and the vertical and/or horizontal distance of the operating stations from the newly installed mandrels can rapidly be adjusted to accommodate the change. Fine adjustments of the movement of reciprocating web transport assembly 24 of wrapping station 2 (see FIGS. 3 and 4) along the slanted path toward and away from mandrel 80 is facilitated by turning hand wheel 130 of a feedscrew adjustable slide assembly 131. Feedscrew adjustable slide assembly 134 (see FIG. 3) may be used for major adjustments of the angular movement of the reciprocating web transport assembly 24 of wrapping station 2 (see FIGS. 3 and 4) toward and away from mandrel 80 by turning hand wheel 130. Vertical adjustment of the reciprocating web transport assembly 24 of wrapping station 2 (see FIGS. 1 and 3) relative to the upper surface of main platform 45 may be effected by means of feedscrew adjustable slide assembly 40. Similar feedscrew adjustable slide assemblies are employed at the welding station 3 and discharge station 4. Any suitable feedscrew adjustable slide assembly may be employed. Typical feedscrew adjustable slide assemblies are, for example, dovetail slide assemblies available from Russel T. Gilman Inc. and Setco Industries, Inc.

Figure 10:
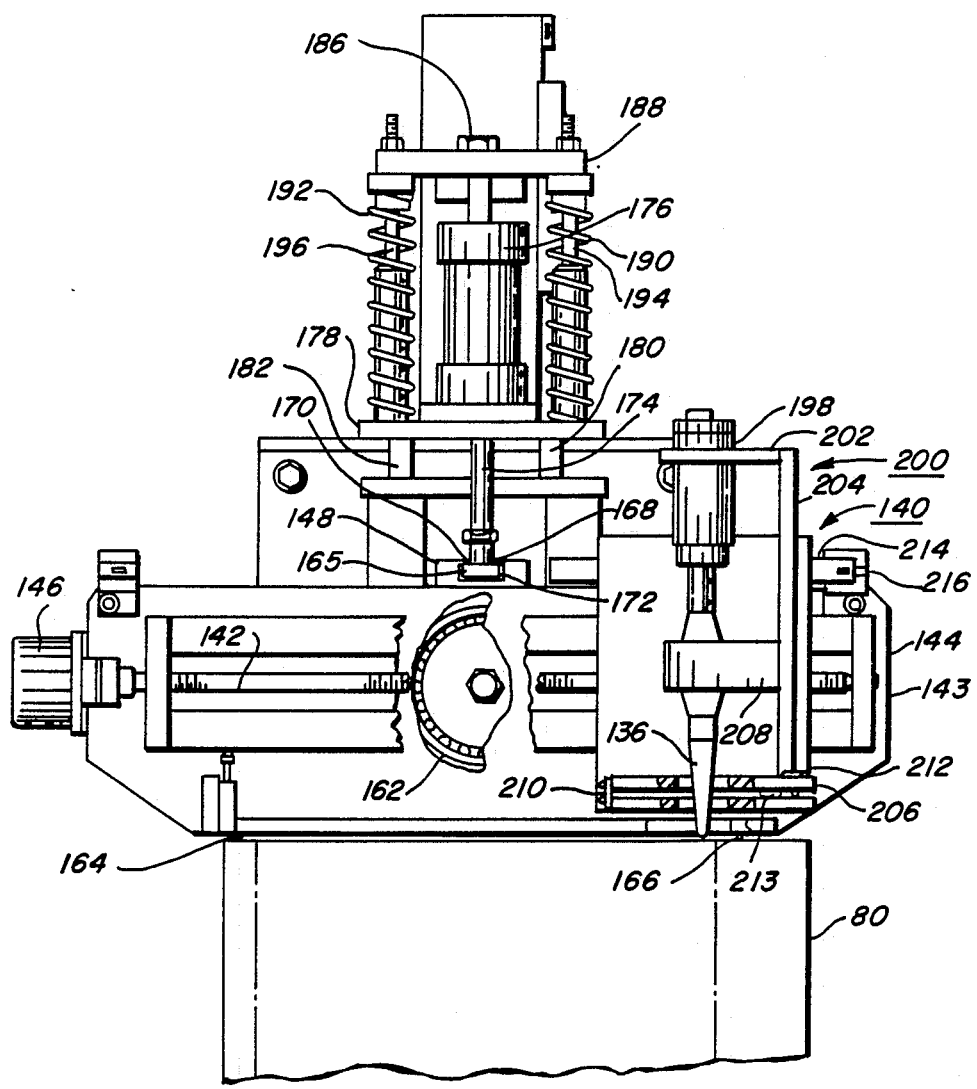
FIG. 10 is a schematic, sectional view of a welding means for belts on a mandrel.
Figure 11:
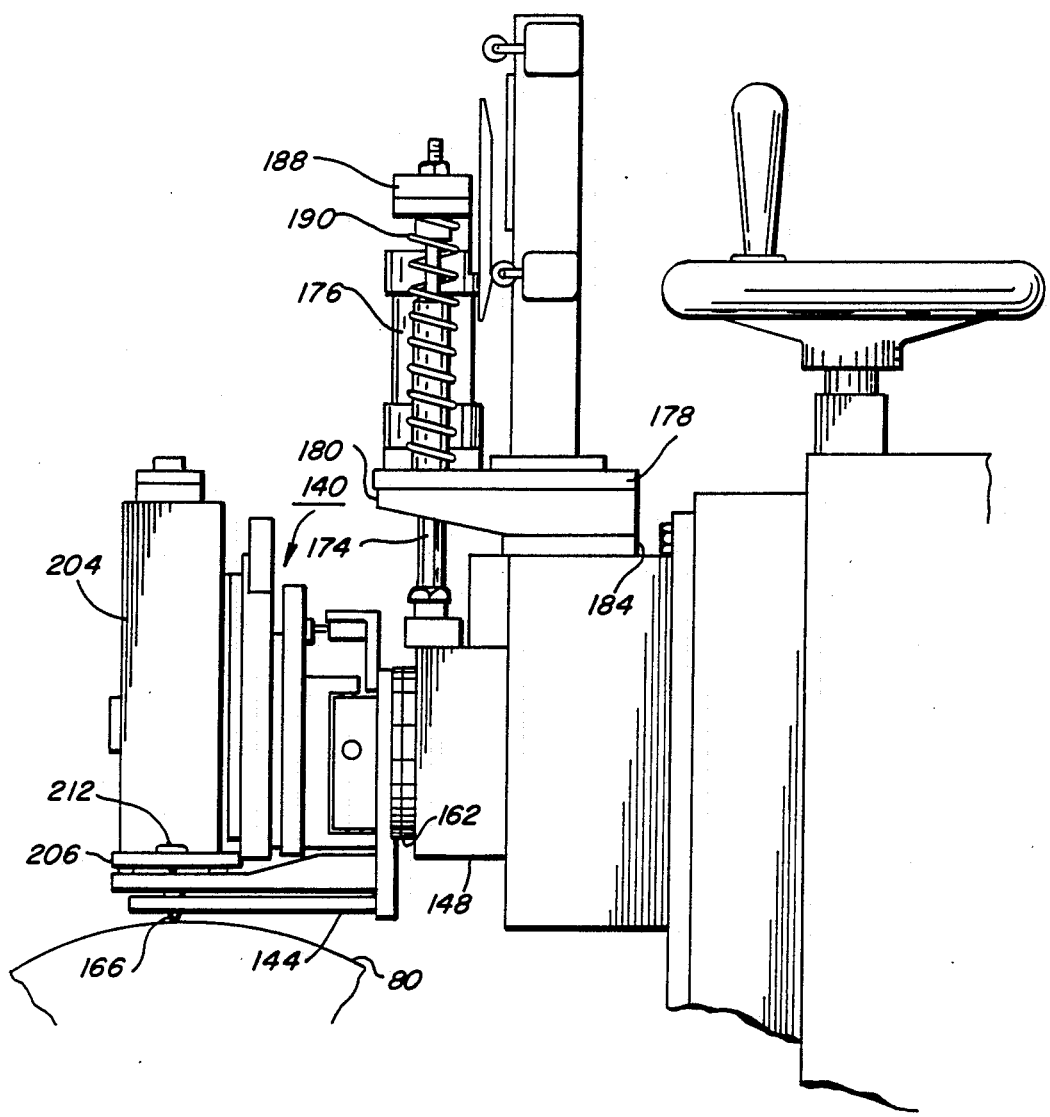
FIG. 11 is another schematic, sectional view of a welding means for welding belts on a mandrel.

Referring to FIGS. 1, 10 and 11, an ultrasonic welding station comprising an ultrasonic horn 136, also referred to as a sonotrode, is illustrated. The seam 138 (see FIG. 1) of overlapping ends of thermoplastic web 6 is supported by the upper surface of mandrel 80 and held in place below the path of ultrasonic horn 136 by suction from parallel rows of ports 90, 91 and 92 (see FIG. 8). The ultrasonic horn 136 is supported by a substantially horizontally reciprocateable carriage 140 which rides on a rotatable lead screw 142. Lead screw 142 is supported near each end by flanges 143 secured to frame assembly 144 and is rotated by electric motor 146 which is also supported by frame assembly 144. Frame assembly 144 is supported by a vertically reciprocateable frame comprising slide plate assembly 148 which is adapted to slide in a vertical direction on a dovetail slide (not shown). Support of frame assembly 144 by slide plate assembly 148 is provided through a ball bearing assembly 162 shown in the cutaway in FIG. 10 and also in FIG. 11. The ball bearing assembly 162 allows frame assembly 144 to swivel in a vertical plane to accommodate any departure of the plane of upper surface of seam 138 from a truly horizontal plane. For example, the attitude of the axis of cantilevered shaft 82 of mandrel 80 may exhibit a slight tilt from horizontal due to gravity. This tilt affects the plane of the seam 138 relative to an imaginary truly horizontal plane. Adjustable spacing pins 164 and 166 are positioned at the bottom of each end of frame assembly 144 to assist in maintaining a predetermined spacing between horn 136 and mandrel 80 and to ensure a uniform pressure between horn 136 and seam 138 as the horn 136 traverses seam 138. The ends of these spacing pins 164 and 166 rest directly on the surface of mandrel 80 on each side of web 6. An upper segment 167 (see FIGS. 7 and 8) of mandrel 80 is replaceable because it is subjected to relatively abrasive conditions. If desired, upper segment 167 may be made of a harder, more wear resistant material than the remainder of mandrel 80.

A retaining notch 165 with lips 168 and 170 is provided at the top of slide plate assembly 148 to accommodate an enlarged end fitting 172 on the lower end of vertically reciprocateable shaft 174 of pneumatic cylinder 176. The lower end of pneumatic cylinder 176 rests on a horizontal plate 178 which is welded to a pair of arms 180 and 182. One end of each arm 180 and 182 are welded to a support assembly 184 and each other end is horizontally cantilevered outwardly from the support assembly 184. The vertically reciprocateable shaft 174 of pneumatic cylinder 176 extends through the top of pneumatic cylinder 176 and the upper end thereof is fastened by nut 186 to horizontal plate 188. A pair of springs 190 and 192 and corresponding guide rods 194 and 196 are positioned between horizontal plates 178 and 188 to bias horizontal plate 188 upwardly away from horizontal plate 178. Ultrasonic horn 136 is driven by a transducer 198. Transducer 198 is supported by a frame assembly 200 comprising plates 202, 204 and 206 and horn guide 208. A frictionless hinge 210 comprising thin shim material is secured to one end of plate 206 and to frame assembly 144 extending from horizontally reciprocateable carriage 140. The frictionless hinge 210 allows bracket frame assembly 200 and horn 136 to pivot along the hinge 210 during welding to compensate in a substantially vertical direction for any irregularities encountered along the seam 138 during welding. An adjustable foot 212 is secured to plate 206 to function as a safety stop for frame assembly 200 and prevent horn 136 from striking mandrel 80 when frame assembly 200 is lowered to the down position illustrated in FIG. 10. A thin air bellows 213 is positioned between plate 206 and frame assembly 200 to adjust the pressure of ultrasonic horn 136 against seam 138, e.g. to function as a counterbalance.

In operation, and with reference to the web transport timing sequence illustrated in FIG. 12, horizontally reciprocateable carriage 140 is raised by inactivation of pneumatic cylinder 176 (A) thereby enabling springs 190 and 192 to retract horn 136 vertically upward. Mandrel 80 wrapped with an overlapping section of web severed from web 6 at wrapping station 2 is then indexed to the welding station 3. Indexing is achieved by providing power to electric motor 193 (see FIG. 3) (B) to rotate by means of suitable means such as bevel gears (not shown) rotatable platform 5 to simultaneously advance the web wrapped mandrel 80 to welding station 3 from wrapping station 2, a mandrel bearing a welded belt to discharge station 4 from welding station 3, and an unwrapped mandrel from discharge station 4 to wrapping station 2. While indexing is occurring, electric motor 146 is activated (C) to drive lead screw 142 which in turn moves horizontally reciprocateable carriage 140, frame assembly 144 and bracket 200 to its start position. Upon return of the horizontally reciprocateable carriage 140 to its starting position, flange 214 mounted on horizontally reciprocateable carriage 140 strikes limit switch 216 to inactivate electric motor 146. After completion of indexing (E), horizontally reciprocateable carriage 140 is lowered by activation of two-way pneumatic cylinder 176 (F) to bring ultrasonic horn 136 into compressive engagement with the seam 138 of overlapping ends of web 6. Electrical power is supplied to transducer 198 and electric motor 146 is activated to drive lead screw 142 which in turn moves horizontally reciprocateable carriage 140, frame assembly 144, bracket 200 and ultrasonic horn 136 along seam 138 (G).

The welding surface of horn 136 may be of any suitable shape such as the flat or curved cross-sectional shapes illustrated, for example, in U.S. Pat. No. 3,459,610 and U.S. Pat. No. 4,532,166, both of which are incorporated herein by reference in their entirety. The high vibration frequency of the horn 136 along the its vertical axis causes the temperature of at least the contiguous overlapping surfaces of thermoplastic web 6 to increase until at least the thermoplastic material in web 6 flows. Welding of the contiguous overlapping surfaces of thermoplastic web 6 will also occur if web 6 also comprises thermoplastic material which flows as a result of the applied energy of ultrasonic oscillations. The thermoplastic web 6 may be coated with thermoplastic coatings. The thermoplastic material that is induced to melt and weld the seam 138 may be provided solely by a coating on the web, from both a coating and a web substrate, or solely from the web itself. The web may be of any suitable thickness which will allow adequate heating of the contiguous overlapping surfaces of the web edges to permit sufficient heat energy to be applied at the contiguous overlapping surfaces to cause the thermoplastic material to melt and weld the overlapping edges of web 6 at seam 138. Any suitable heating technique may be used to provide the heat necessary at the contiguous overlapping surfaces to melt the thermoplastic material and cause it to weld web 6 at seam 138. Typical heating techniques include ultrasonic welding, radio frequency heating and the like. Ultrasonic welding is preferred because it causes generation of heat at the contiguous overlapping surfaces of the web edges at seam 138 to maximize melting of the thermoplastic material. If desired, the horn 136 may comprise highly thermoconductive material such as aluminum to ensure higher temperatures at the interface between the overlapping webs and minimize thermal distortion of the exposed surfaces of the web 6. When ultrasonic welding is utilized it is believed that the rapid impaction of one edge of web 6 with the other edge of web 6 at the contiguous overlapping web surfaces between the mandrel 80 and horn 136 causes generation of heat. A horn vibration frequency of about 16,000 kHz or higher may be utilized to cause the thermoplastic material to soften. A typical horn suitable for joining thin thermoplastic webs utilizes a sonic generator of about 400-800 watt capacity, an operational frequency of about 20 kHz, and a flat input horn welding surface about 12 millimeters long and about 0.04 to 0.1 centimeter wide. A typical motion amplitude for this horn is about 76 micrometers. The combined weight of about 2.5 kilograms for the ultrasonic vibration generator and the horn 136, transducer 198 and bracket 200 is sufficient to bring the horn into forced contact with the seam. However, air bellows 213, a spring bias, weights, counterweights, or other suitable means may be utilized to increase or decrease the contact force. Since heat is generated very rapidly at the interface of the overlapping web ends at seam 138 with this type of device, sufficient heat to cause the thermoplastic materials to melt can occur typically in about 0.2 second as the horn traverses the along the seam 138.

When photoreceptor belts having a greater or lesser width or diameter than the belts currently in production must be fabricated, mandrels of the appropriate diameter and/or width are rapidly and easily substituted for the previous mandrel and the vertical distance of the welding station from the newly installed mandrel can be adjusted to compensate for the change. The adjustment of the vertical spacing of the reciprocateable carriage 140 at welding station 3 (see FIG. 1) toward and away from mandrel 80 is facilitated by the use of a feedscrew adjustable slide assembly 218 comprising a pair of mating dovetailed slide segments 220 and 222 and a hand wheel 224 which turns a feedscrew (not shown) to achieve relative movement between the mating dovetailed slide segments 220 and 222. Any other suitable feedscrew adjustable slide assembly may be employed. Typical feedscrew adjustable slide assemblies are available from Russel T. Gilman Inc. and Setco Industries, Inc. If desired, horizontal adjustments may be made by mounting a horizontally adjustable slide assembly to the feedscrew adjustable slide assembly 218 in a manner similar to that illustrated for the wrapping station 2.

Upon completion of welding of seam 138 at welding station 3, the welded belt must be removed from mandrel 80 without damaging the sensitive surface of the belt. For photoreceptor belts, even the presence of human fingerprints or scratches will render the belt unsuitable for electrophotgraphic copiers, duplicators and printers. Since the welded belt is wrapped securely around mandrel 80, removal is facilitated by reducing the radius of at least a segment of the mandrel 80. Referring to FIGS. 7 and 8, reduction of the radius of at least a segment of mandrel 80 is effected by moving a segment 226 toward the center of mandrel 80. Such movement may be effected by various techniques. In FIGS. 7 and 8, the movement of segment 226 is controlled by activating a pneumatic cylinder 227 by means of air pressure supplied from a suitable source (not shown) through a line fitted with a valve (not shown) controlled by programmable controller 32. Pneumatic cylinder 227 is anchored to the mandrel 80 at one end (not shown) and to drive bar 228 which is secured to two pairs of roller cam follower support rails 230, 232, 234 and 238 (see FIG. 1). Rails 230 and 232 support rotatable roller cam followers 240 and 242 as well as rotatable rollers 244 and 246 (see FIG. 7). An identical arrangement of rollers is employed on rails 234 and 238 with only rotatable roller cam follower 248 and rotatable roller 250 being visible in FIG. 8. Rotatable roller cam followers 240 and 242 ride on cams 252 and 254, respectively. The cams 252 and 254 are secured to segment 226. An identical arrangement of cams are utilized for rails 234 and 238 with only cam 256 being visible in FIG. 8. Segment 226 is fitted with a pin 258 having an enlarged flat head 260 which functions as a stop to limit the downward distance of travel for segment 226. A spring 262 biases the segment 226 in an upward direction. Several pin and spring combinations (not shown) are positioned along the length of segment 226 to ensure that segment 226 is substantially evenly spring biased upwardly.

Activation of pneumatic cylinder 227 drives drive bar 228 and rails 230, 232, 234 and 238 into the mandrel 80 whereby the rotatable roller cam followers allow the cams and segment 226 to move toward the axis of mandrel 80. Activation of pneumatic cylinder 227 is accomplished by pressurized air fed through hose 264, internal air passageways (not shown) in mandrel 80, and circumferential channel 268 shown in FIG. 7. Circumferential channel 268, is connected through an air line through the journal box 272 (see FIG. 1) to circumferential channels (not shown, but of basically similar construction to the circumferential channel 268) on central support shaft 107 which supports rotatable platform 5. Positive pressure, a vacuum or ambient air pressure may be supplied from any suitable conventional source to the circumferential channel on the central support shaft 106 by conventional means such as air coupling lines (not shown) equipped with commercially available solenoid actuated valves. Similarly, electrical power to drive electrical equipment such as motors, solenoids and the like in the mandrel for discharge station 4 are supplied through conventional slip rings (not shown) mounted on central support shaft 107. Electrical switching may be effected with any suitable commercially available computer controllable switches in the cluster of valves and switches 105 (see FIG. 1) for powered components in mandrel 80. Excellent results have been achieved with a programmable controller 32 such as a Texas Instruments Programmable Controller Model 530. Once segment 226 has been retracted, the welded belt hangs loosely on mandrel 80 and can be slipped off the free end of mandrel 80 at discharge station 4. To assist removal and reduce friction between the inner surface of the welded belt and the outer surface of mandrel 80, air may be introduced between these two surfaces by suitable means such as ports 274 arranged around the periphery of mandrel 80. Air for ports 274 may be supplied through air passageways 276, and circumferential channel 278 shown in FIG. 7. Circumferential channel 278, is connected through an air line through the journal box 272 (see FIG. 1) to circumferential channels (not shown, but of basically similar construction to the circumferential channel 278) on central support shaft 107 which supports rotatable platform 5. Control of conventional solenoid operated valves in the valve and switch cluster 105 (see FIG. 1) between a suitable source of compressed air (not shown) and ports 274 may be accomplished with programmable controller 32.

Figure 14:
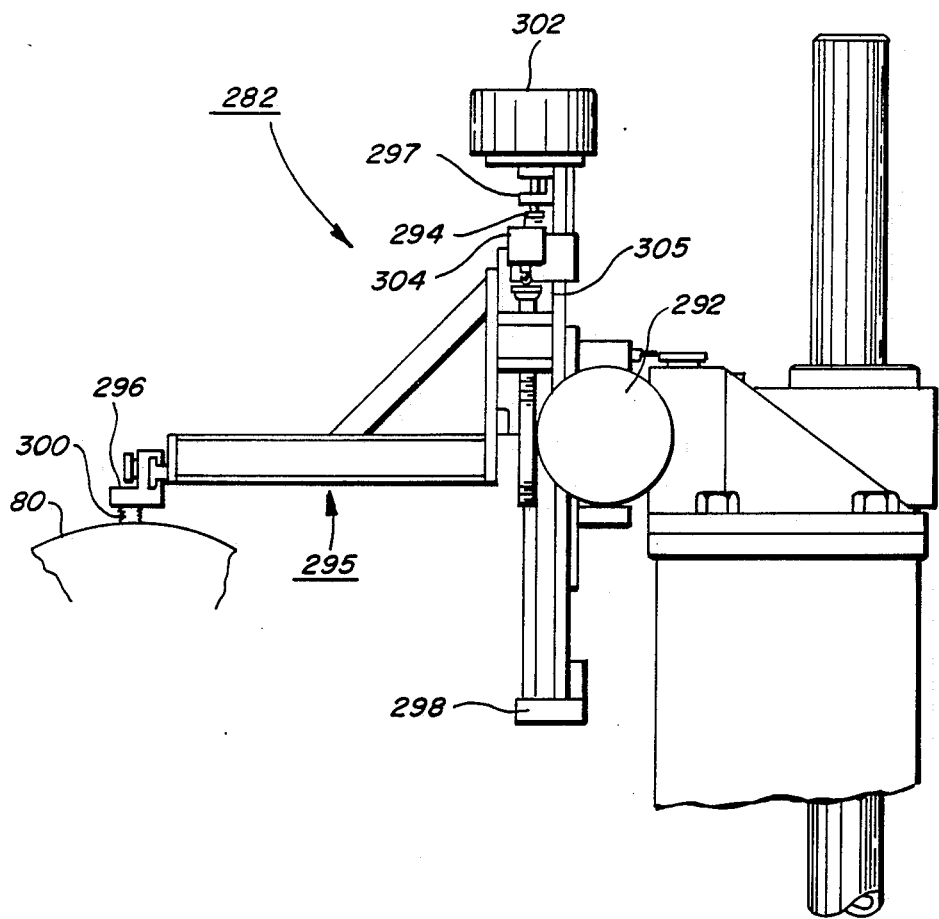
FIG. 14 is another schematic, sectional view of means to remove welded belts from a mandrel.

The welded belt is removed from the free end of mandrel 80 by a conveyor 280 illustrated in FIGS. 1, 13 and 14. Conveyor 280 comprises a carriage 282 which rides on a horizontal lead screw 283 supported at each end by flanges 284 and 286 welded to an elongated frame 287 supported at one end by a journal box 280 on central support shaft 107 and supported at the other end by raised support frame (not shown) to which the elongated frame 287 is secured by bolts 290. Horizontal lead screw 283 is driven by electric motor 292. Carriage 282 comprises a vertically aligned lead screw 294 supported at each end by flanges 297 and 298. Vertically aligned lead screw 294 supports a cantilevered arm assembly 295 comprising a vacuum housing 296 and a row of resilient cups 300. Vertically aligned lead screw 294 is driven by electric motor 302. In operation, electric motor 292 is activated to drive horizontal lead screw 283 which in turn moves carriage 282 to a location adjacent to and over mandrel 80. The positioning of carriage 282 adjacent mandrel 80 simultaneously positions the resilient cups 300 of vacuum housing 296 directly over the welded belt hanging on mandrel 80. The cantilevered arm assembly 295 is positioned near the upper end of vertically aligned lead screw 294 to ensure that suction cups 300 clear both the mandrel 80 and the welded belt during the initial positioning of carriage 282 adjacent to mandrel 80. After the cantilevered arm assembly 295 clears the welded belt and is stopped over the welded belt, electric motor 302 is activated to drive vertically aligned lead screw 294 which in turn lowers vacuum housing 296 and resilient cups 300 toward the welded belt. At approximately the same time, a partial vacuum is created in vacuum housing 296. As the resilient cups 300 are lowered downwardly and are closely spaced from the seam 138 of the welded web, the partial vacuum lifts the web and holds the web against the resilient cups 300. The electric motor 302 is inactivated when limit switch 304 strikes adjustable stop 305. Adjustable stop 305 may be adjusted to allow discharge station 4 to accommodate mandrels having diameters larger or smaller than that of mandrel 80. Electric motor 292 is thereafter activated to transport the welded belt to pick up arm 306 (see FIG. 1) of a conveyor (not shown). After the welded belt loop envelops pick up arm 306, the partial vacuum supplied to vacuum housing 296 is replaced by ambient air pressure and the welded belt is allowed to drop onto pick up arm 306 to be conveyed away for further processing. The creation and removal of a partial vacuum in vacuum housing 296 are accomplished by programmable controller 32 which actuates suitable valves in valve and switch cluster 31 (see FIG. 1) which either vent vacuum housing 296 to the ambient atmosphere or connect vacuum housing 296 through conventional flexible hoses (not shown) to another larger evacuated chamber. Similarly, programmable controller 32 activates switches in the valve and switch cluster 31 to activate electric motors 292 and 302.

If desired, an optional feedscrew vertically adjustable slide assembly 308 (see FIG. 1) may be installed at discharge station 4 to process the welded belt prior to or during removal of the belt from mandrel 80. For example, a notching station may be mounted on adjustable slide assembly 308 to trim any flashing that may have formed at each end of seam 138 during welding. The notching station may comprise, for example, one or more reciprocating punches that removes the flashing while the belt rests on mandrel 80. Vertical adjustment of slide assembly 308 permits accommodation of different diameter mandrels. Horizontal adjustment capabilities may be achieved by mounting a horizontally adjustable slide assembly to the feedscrew vertically adjustable slide assembly 308 in a manner similar to that illustrated for the wrapping station 2.

In operation, and with reference to FIG. 15, cantilevered arm assembly 295 is initially in a retracted "up" position (A). The previously vacuum applied to parallel rows of ports 90, 91 and 92 on mandrel 80 is maintained (B). Mandrel 80 wrapped with the welded web belt is indexed to discharge station 4 by providing power to electric motor 193 (see FIG. 3) to rotate rotatable platform 5 (C) thereby transporting the welded belt on mandrel 80 to discharge station 4 from wrapping station 2. Electric motor 292 is activated (D) to drive carriage 282 to position resilient cups 300 over mandrel 80 bearing the welded belt (E). When resilient cups 300 are directly over mandrel 80 bearing the welded belt, electric motor 302 is activated (F) to lower vacuum housing 296 and resilient cups 300 to the welded belt on mandrel 80 (G). At this time, a vacuum is supplied to vacuum housing 296 including resilient cups 300 (H). After the resilient cups 300 contact and grip the belt at seam 138, pneumatic cylinder 226 in mandrel 80 is activated to retract segment 226 toward the axis of mandrel 80 (I) to provide sufficient slack in the belt to permit removal of the belt from the mandrel 80. The vacuum applied to ports 90, 91 and 92 is discontinued (J) and air is introduced between the welded belt and mandrel 80 through ports 274 arranged around the periphery of mandrel 80 (K) to form an air bearing to facilitate removal of the belt from the mandrel 80 and avoid damage to the surfaces of the welded belt. Electric motor 302 is activated (L) to raise vacuum housing 296 and resilient cups 300 thereby lifting the upper surface of welded belt away from the upper surface of mandrel 80. Electric motor 292 is activated (M) to drive carriage 282, resilient cups 300 and the welded belt to pick up arm 306 which conveys the welded belt away for further processing. Pressurized air supplied to ports 274 on mandrel 80 is discontinued, the vacuum applied to resilient cups 300 is also discontinued (O), and mandrel segment 226 is extended away from the axis of mandrel 80 (P).

When photoreceptor belts having a greater or lesser width or diameter than the belts currently in production must be fabricated, mandrels of the appropriate diameter and/or width are rapidly and easily substituted for the previous mandrel and the vertical distance of the cantilevered arm assembly 295 in discharge station 4 from the newly installed mandrel can be adjusted to compensate for the change. The adjustment of the vertical spacing of the cantilevered arm assembly 295 in discharge station 4 (see FIG. 1) from mandrel 80 is accomplished by merely rotating an adjustable stop 305 which controls the distance that cantilevered arm assembly 295 descends. As indicated above, rotation of hand wheel 307 of adjustable slide assembly 308 turns a feedscrew (not shown) to achieve relative movement between the mating dovetailed slide segments thereby effecting vertical adjustment of the notching station relative to the mandrel 80. Any other suitable feedscrew adjustable slide assembly may be employed. Horizontal adjustment of the notching station relative to an edge of belt 6 may be achieved by mounting a horizontally adjustable slide assembly to the feedscrew vertically adjustable slide assembly 308 in a manner similar to that illustrated for the wrapping station 2 and welding station 3. Typical feedscrew adjustable slide assemblies are available from Russel T. Gilman Inc. and Setco Industries, Inc.

Although this apparatus and process has been described with reference to the formation of a belt on mandrel 80 as it progressed from wrapping station 2 to welding station 3 and finally to discharge station 4, it should be understood that other belts are simultaneously being processed on or removed from identical mandrels at the other stations. In a less desirable alternative embodiment which normally requires more space, the mandrels may be transported in a non-circular path from one station to the next. For example, the stations may be located in a single row with the mandrels being routed in a loop from the last station to the first station. In this less preferred embodiment, the axis of each mandrel is preferably aligned substantially parallel to the path along which each mandrel is transported. This simplifies alignment of the mandrels at each station without undue positioning of the apparatus at each station to accommodate the arrival of a fresh mandrel.

Any suitable thin, flexible web comprising a thermoplastic layer may be used in the apparatus and process of this invention. The web may comprise a single layer or a plurality of layers in which at least one of the layers comprises thermoplastic material. Any suitable thermoplastic, polymeric material which will melt at the temperatures generated at the contiguous overlapping web surfaces of the seam may be utilized. Typical thermoplastic, polymeric materials include polyethylenes, polypropylenes, polycarbonates, polyvinylacetate, terephthalic acid resins, polyvinylchloride, styrene-butadiene copolymers and the like. The thermoplastic material that is induced to melt and weld the seam may be provided solely by a thermoplastic coating on the web, from both a coating and a web substrate, or solely from the web itself. Thus, for example, a nonthermoplastic web substrate may be coated with a thermoplastic material which is the sole source of the material which melts. Alternatively, for example, the web may be uncoated and consist entirely of the thermoplastic material, some of which melts to weld the seam. The web may be of any suitable thickness which will allow adequate heating of the contiguous overlapping surfaces of the web edges to permit sufficient heat energy to be applied at the contiguous overlapping surfaces to cause the thermoplastic material to melt and weld the overlapping edges of web at the seam. Preferred web thicknesses for use with ultrasonic welding can range from between about 25 micrometers to about 0.5 millimeter. Thicker webs may be utilized as long as sufficient heat is applied to the contiguous overlapping surfaces of the web to cause the thermoplastic material to melt. Webs having a thickness up to about 10 millimeters may be joined with the process and apparatus of this invention.

In a specific example, a web of polyester film (Mylar, available from E.I. duPont de Nemours and Co.) having a width of about 41.4 cm and a thickness of about 76 micrometers and having a first coating on one side of a polyester having a thickness of about 0.2 micrometer and a second coating comprising polyvinyl carbazole about 3 micrometers thick was coated on both sides with a layer comprising polycarbonate resin, each polycarbonate coating having a thickness of about 25 micrometers. This web was processed in an apparatus similar to the apparatus illustrated in the drawings. The leading edge of the web was fed over cylindrical air bearings from a supply roll over a retracted support platform at a wrapping station. The end of the web was flush with the far edge of the platform (relative to the location of the supply roll) as a result of shearing during a previous wrapping cycle. The end of the web was held to the far edge of the platform by a vacuum applied to apertures in the platform adjacent the end of the web. A cylindrical mandrel having an outside circumference of about 1230 mm and supported on a rotatable platform was transported from a discharge station to the wrapping station by rotation of the platform. Upon arrival of the mandrel at the wrapping station, a vacuum pick up arm having vacuum apertures was brought into contact with the upper surface of the leading edge of the web. The web was pulled from the supply roll by advancing the support platform and pick up arm toward the mandrel to a position intermediate the retracted position of the support platform and the mandrel surface. With the aid of a vacuum applied to the vacuum apertures of the vacuum pick up arm, the vacuum pick up arm gripped the leading edge of the web and placed it over a row of apertures extending axially near the upper outer surface of the cylindrical mandrel. One edge of the web was monitored to detect any deviation from a predetermined position on the support platform. When misalignment of, for example, more than about 0.005 in was detected, the pick up arm was moved along a path perpendicular to the path of the web to realign the web edge with the predetermined position. Depending upon the tolerances desired for the finished belt, a larger or smaller degree of misalignment may be acceptable. This ensured that the web edge would be aligned with a predetermined location on the cylindrical mandrel during a subsequent wrapping operation. The cylindrical mandrel carried a row of apertures extending axially along the outer surface of the cylindrical mandrel. This row of apertures was about 15 degrees from the 12 o'clock position of the mandrel. A vacuum was applied to the row of apertures on the mandrel to grip the leading edge of the web and the vacuum applied to the vacuum apertures of the vacuum pick up arm was removed. The pick up arm was thereafter retracted. The mandrel was rotated about 345 degrees to wrap the cylinder with the web at, for example, a web tension of about 1 pound per inch of width. The web extending over the edge of the support platform was sheared along the edge of the support platform to form a trailing edge on the sheared web. The length of the sheared web was sufficiently long to allow the trailing edge of the web to overlap the leading edge to form a seam width of about 1.2 millimeters. The seam was supported on the mandrel along the entire length of the seam and held in place by a vacuum applied to a row of apertures on the cylindrical mandrel near the trailing end of the sheared web.

The support platform and the pick up arm were then retracted sufficiently to provide clearance as the mandrel wrapped with the coated web was advanced on the rotatable platform to a welding station. The vacuum previously applied to the rows of apertures on the mandrel was maintained during advancement to the welding station. While the wrapped mandrel was being advanced to the welding station, an unwrapped mandrel was simultaneously advanced to the wrapping station from a discharge station. Upon arrival at the welding station, an ultrasonic welding horn supported in a carriage was lowered against the web seam. The horn was biased against the seam due to the controlled weight of about 2.5 kilograms of horn, transducer, bracket and any counterweight pressing against the seam supported by the mandrel. The horn had a flat input horn welding surface about 12 millimeters long and about 0.04 to 0.1 centimeter wide, was operated at a frequency of 20 kHz and a motion amplitude of about 76 micrometers. The horn was transported by the carriage in a substantially horizontal path along the web seam at a rate of about 5 centimeters per second. During welding, the horn was allowed to freely move vertically to accommodate variations in the web seam thickness and deviations of any segment of the web seam from a truly horizontal spatial attitude. Vertical movement of the horn was facilitated by the use of a horn carriage track which was freely pivotable in a vertical plane. This welding procedure caused the thermoplastic materials in the web to uniformly melt and weld the web seam. Upon completion of the welding of the belt seam, the ultrasonic welding horn was raised away from the web seam to a retracted position.

The mandrel wrapped with the welded belt was advanced on the rotatable platform to a discharge station. While the mandrel bearing the welded web was being advanced to the discharge station, a web wrapped mandrel was simultaneously advanced to the welding station from the wrapping station and an unwrapped mandrel was simultaneously advanced to the wrapping station from the discharge station. The vacuum applied previously to the apertures on the mandrel was maintained. Upon arrival at the discharge station, twelve resilient vacuum cups supported in a row on a carriage were lowered against the welded seam of the web belt. A vacuum was supplied to the resilient vacuum cups and the circumference of the mandrel was reduced by retraction of an outer segment of the mandrel toward the axis of mandrel. This provided sufficient slack in the welded belt to permit removal of the belt from the mandrel. The vacuum applied to the apertures on the mandrel was discontinued and air was introduced between the welded belt and mandrel through ports located around the periphery of the mandrel to form an air bearing which facilitated removal of the belt from the mandrel and prevented damage to the sensitive surfaces of the welded belt. The resilient vacuum cups were then raised to lift the upper surface of welded belt away from the upper surface of the mandrel. The carriage supporting the resilient vacuum cups and the welded belt was thereafter transported horizontally away from the end of the mandrel thereby conveying the welded belt away for further processing. The pressurized air supplied to the ports on the mandrel and the vacuum applied to resilient vacuum cups were discontinued. The outer segment of the mandrel was extended away from the axis of mandrel to ready the mandrel for the wrapping station.

During continued operation of the belt making process, defective sections of the web were encountered at the wrapping station. These undesirable sections were automatically separated (culled) from quality portions of the web by detecting bar codes previously applied to the edge of the web prior to, during or after coating of the web. These predetermined defect maps based on the bar code reference marks on the web indicating defective sections of the web were detected with a sensors, such as a reader available from Scopescan, positioned at the support platform of the wrapping station over the path of the bar codes. When the scanner detected a bar code that had previously been identified as indicating the location of a defect, the detection signal was transmitted to a Texas Instruments Programmable Controller, Model No. 530. This Programmable Controller was previously programmed to switch to a rejection mode when a defect detection signal was received from the reader to release the leading edge of the web at a point near the bottom of the mandrel by discontinuing the vacuum applied to the row of apertures on the mandrel which initially gripped the leading edge of the web during transfer from the pick up arm. As the leading edge of the web fell away from the underside surface of the mandrel it was drawn into the nip between a pair of rotating rolls which guided the web onto a conveyor for disposal as scrap. After the support platform was retracted, the web was sheared and the leading edge of a fresh web free of defects was in position for the initiation of a normal wrapping cycle. The rotatable platform remained stationary during the culling operation.

To prepare a photoreceptor belt having a width of about 33.5 cm and an inside circumference of about 59 cm, a mandrel having a width of about 38.1 cm and an outside circumference of about 59 cm was substituted for the previous mandrel and the vertical and horizontal distances of the components of the operating stations from the newly installed mandrels were adjusted to accommodate the change. Although it may not be necessary, the pick up arm was replaced with another pick up arm having vacuum pick up slots that were slightly shorter than the width of the new 33.5 cm wide photoreceptor web. If desired, the original pick up arm could probably have been used either in a modified or unmodified configuration. Modifications that can be made to the original pick up arm include applying tape, putty or other suitable material over the portion of the slots in the pick up arm that extended beyond the edge of the new web. The support platform and vacuum pick up arm of the wrapping station was moved along a slanted path toward the top of the newly installed smaller diameter mandrel by turning a hand wheel of a feedscrew adjustable slide assembly (available from Thomson Industries, Manhasset, N.Y.) on which both the support platform and vacuum were mounted. Lowering of the support platform and vacuum pick up arm along a vertical path was effected by turning a hand wheel of another dovetailed feedscrew adjustable slide assembly slide assembly (available from Russel T. Gilman Inc.) on which the support platform and vacuum pick up arm were mounted. Similar adjustments were made at the welding and discharge stations to accommodate the smaller diameter mandrel. The ultrasonic welding horn supported and supporting carriage were lowered toward the top of the mandrel by turning a hand wheel of a dovetailed feedscrew adjustable slide assembly slide assembly (available from Russel T. Gilman Inc.) on which the ultrasonic welding horn and supporting carriage were mounted. The adjustment of the vertical spacing of the cantilevered arm assembly in the discharge station toward the smaller diameter mandrel was accomplished by merely rotating an adjustable stop which controls the distance that cantilevered arm assembly ascends. As indicated above, rotation of hand wheel of the adjustable slide assembly turns a feedscrew to achieve relative movement between the mating dovetailed slide segments thereby effecting vertical adjustment of the notching station relative to the smaller mandrel. Horizontal adjustment of the notching station relative to an edge of belt was achieved by mounting a horizontally adjustable slide assembly to the feedscrew vertically adjustable slide assembly in a manner similar to that for the wrapping station and welding station using feedscrew adjustable slide assemblies (available from Russel T. Gilman Inc. and Setco Industries, Inc.). Although the width of the new mandrel was narrower than the previous mandrel, alignment of one edge of the different width webs is normally effected relative to a common vertical plane so edge alignment adjustments generally need not be made when webs of different widths are used. Welded belts were then prepared with the new smaller diameter mandrels in substantially the same manner as the previously fabricated smaller diameter belts.

The apparatus and process of this invention continuously shapes, cuts and welds webs into belts in less time without duplicate manual handling. Further, the marked reduction of manual handling decreases the likelihood of damage to sensitive substrates or coatings, particularly for coated substrates that demand precision tolerances such as flexible organic photoreceptors for high speed electrostatographic copiers, duplicators, printers and the like. Moreover the apparatus of this invention occupies less floor space and minimizes the equipment needed for alignment, cutting, welding trimming and other processing of the webs and belts. In addition, the apparatus and process of this invention achieve greater uniform belt conicity and uniform quality. Also, because of differences in belt size requirements for different electrostatographic copiers, duplicators, printers and the like, the apparatus of this invention can be rapidly and easily converted from fabricating a belt of one diameter or width to preparing a belt of a different diameter or width. Moreover, the characteristics of belt fabrication systems of this invention exhibit are capable of rapidly manufacturing belts of different widths and diameters within precise tolerance standards.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. Apparatus for fabricating electrostatographic imaging belts comprising a wrapping station, a welding station, at least a first rotatable mandrel and a second rotatable mandrel, said first rotatable mandrel and said second rotatable mandrel each comprising a cylinder having at least one first opening or one first series of openings extending axially along said outer surface of said cylinder and at least one second opening or second series of openings extending axially along said outer surface of said cylinder, said second opening or second series of openings being adjacent to and circumferentially spaced on said cylinder from said first opening or first series of openings, means to support said first rotatable mandrel, means to support said second rotatable mandrel, transporting means for conveying rotatable mandrels to and from said wrapping station and said welding station along an arc of a circular path lying in an imaginary plane extending through and parallel to the axis of said first rotatable mandrel and said second rotatable mandrel, said axis of said first rotatable mandrel and said second rotatable mandrel each being substantially perpendicular to imaginary lines radially emanating from the center of said circular path, said welding station comprising a welding means, means for supplying the leading edge of a web from a web supply roll to said wrapping station, said transporting means being adapted to position the axis of said first rotatable mandrel parallel to said leading edge of said web at said wrapping station, pick up means adapted to grip only said leading edge and position said leading edge of said web on and parallel to said first opening or first series of openings on said first rotatable mandrel conveyed to said wrapping station by said transporting means, means to form a partial vacuum within said first opening or first series of openings to secure said leading edge of said web on said first rotatable mandrel, means to rotate said first rotatable mandrel at said wrapping station about one revolution whereby said web is wrapped around said first rotatable mandrel, means to sever said web to form a trailing edge whereby said trailing edge of said web on said first rotatable mandrel at said wrapping station overlaps said leading edge of said web to form a first belt having a seam, means to form a partial vacuum within said second opening or second series of openings to secure the area of said web adjacent said trailing edge to said first rotatable mandrel, means to activate said transporting means to simultaneously convey said first rotatable mandrel wrapped with said first belt having said seam to said welding station and convey said second rotatable mandrel to said wrapping station for wrapping with a second belt, and means to weld said seam on said first belt at said welding station at substantially the same time as said second rotatable mandrel is wrapped at said wrapping station with said second belt.

2. Apparatus according to claim 1 including a discharge station adjacent to said welding station and adapted to remove said first belt from said first rotatable mandrel and means for conveying said first rotatable mandrel to said discharge station for removal of said first belt from said first rotatable mandrel.

3. Apparatus according to claim 2 wherein said first rotatable mandrel comprises means to reduce the outer circumference of said mandrel in a direction perpendicular to the mandrel axis, and said discharge station comprises at least one suction means adapted to grip said belt only at said seam, lift said belt away from said upper surface of said mandrel after said outer circumference of said mandrel is reduced and substantially horizontally convey said belt away from one end of said mandrel.

4. Apparatus according to claim 2 wherein said transporting means is adapted to simultaneously convey said first rotatable mandrel from said welding station to said discharge station, convey said second rotatable mandrel from said wrapping station to said welding station, and convey a third rotatable mandrel from said discharge station to said wrapping station.

5. Apparatus according to claim 4 wherein said transporting means comprises a rotatable platform which is adapted to simultaneously convey said first rotatable mandrel, said second rotatable mandrel and said third rotatable mandrel.

6. Apparatus according to claim 4 wherein said wrapping station, said welding station, and said discharge station are adapted to receive mandrels of different sizes.

7. Apparatus according to claim 1 wherein said means to support said first rotatable mandrel and said means to support said second rotatable mandrel are each adapted to receive mandrels of different sizes.

8. Apparatus according to claim 1 wherein said pick up means adapted to position said leading edge of said web on said first opening or first series of openings comprises a reciprocating arm having at least one vacuum port adapted to grip and transport said leading edge to said first opening or first series of openings.

9. Apparatus according to claim 1 wherein said wrapping station comprises means to laterally displace said pick up means in a direction perpendicular to the length of said web to align one longitudinal edge of said web with a predetermined position at said wrapping station.

10. Apparatus according to claim 1 wherein said means to weld said seam on said first belt comprises means adapted to vertically advance an ultrasonic welding horn toward said seam from a retracted position and adapted to substantially horizontally traverse and weld said seam with said horn after said horn is vertically advanced toward said seam.

11. Apparatus according to claim 10 wherein said means to weld said seam on said first belt comprises support means adapted to contact the upper surface at each end of said first rotatable mandrel at said welding station to align said horn with said seam during traverse.

12. Apparatus according to claim 1 wherein said welding means is adapted to pivot in a vertical plane to align itself to said upper surface of said mandrel during said traverse.

13. Apparatus according to claim 1 wherein said mandrel has a substantially circular cross section.

14. A process for fabricating electrostatographic imaging belts comprising conveying a first mandrel to a wrapping station, supplying the leading edge of a web from a web supply roll to said first mandrel at said wrapping station gripping only said leading edge by means of a partial vacuum applied through at least one opening or series of openings of a pickup means, retaining said leading edge of said web on said first mandrel, said leading edge being parallel to the axis of said first rotatable mandrel, wrapping said web around said first mandrel by rotating said first mandrel for about one revolution, severing said web at said wrapping station to form a trailing edge which overlaps said leading edge of said web to form a first belt having a seam, substantially simultaneously conveying said first mandrel to a welding station comprising a belt welding means and conveying a second mandrel to said wrapping station, substantially simultaneously wrapping said second mandrel with fresh web material from said web supply roll and welding said seam on said first belt on said first mandrel to form a unitary belt, conveying said first mandrel along an arc of a substantially circular path to said wrapping station and to said welding station and while conveying said second mandrel along an arc of a substantially circular path to said wrapping station and maintaining during conveying the axis of said first mandrel and said second mandrel in an imaginary plane extending through and parallel to the axis of said first rotatable mandrel and in an attitude substantially perpendicular to an imaginary line radially emanating from the center of said circular path.

15. A process according to claim 14 including conveying said first mandrel bearing said unitary belt to a discharge station and removing said unitary belt from one end of said first mandrel.

16. A process according to claim 15 including removing said unitary belt from one end of said first mandrel by reducing the outer circumference of said first mandrel, gripping said unitary belt at said seam with suction cups, lifting said seam up from said first mandrel and sliding said belt off one end of said first mandrel.

17. A process according to claim 15 including substantially simultaneously conveying said first mandrel bearing said unitary belt from said welding station to said discharge station, conveying said second mandrel from said wrapping station to said welding station, and conveying a third mandrel from said discharge station to said wrapping station.

18. A process according to claim 17 including substantially simultaneously conveying said first mandrel bearing said unitary belt from said welding station to said discharge station, conveying said second mandrel from said wrapping station to said welding station, and conveying a third mandrel from said discharge station to said wrapping station in substantially a circular path.

19. A process according to claim 14 including replacing said first mandrel and said second mandrel with mandrels having a different size than said first mandrel and said second mandrel and repeating said process to form a unitary belt of a different size.

20. A process according to claim 14 including gripping said leading edge of said web and laterally displacing said web in a direction perpendicular to the length of said web to align one longitudinal edge of said web with a predetermined position at said wrapping station whenever said longitudinal edge of said web deviates away from said predetermined position.

* * * * *